(12) United States Patent
Furuta et al.

(10) Patent No.: US 11,153,683 B2
(45) Date of Patent: Oct. 19, 2021

(54) SOUND SIGNAL CONTROL DEVICE AND METHOD, AND RECORDING MEDIUM

(71) Applicant: Mitsubishi Electric Corporation, Tokyo (JP)

(72) Inventors: Satoru Furuta, Tokyo (JP); Atsuyoshi Yano, Tokyo (JP); Bunkei Matsuoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/643,433

(22) PCT Filed: Nov. 29, 2017

(86) PCT No.: PCT/JP2017/042779
§ 371 (c)(1),
(2) Date: Feb. 28, 2020

(87) PCT Pub. No.: WO2019/106748
PCT Pub. Date: Jun. 6, 2019

(65) Prior Publication Data
US 2020/0366987 A1 Nov. 19, 2020

(51) Int. Cl.
*H04R 3/04* (2006.01)
*G06T 7/70* (2017.01)
(Continued)

(52) U.S. Cl.
CPC ............ *H04R 3/04* (2013.01); *B60R 11/0217* (2013.01); *B60R 11/0247* (2013.01);
(Continued)

(58) Field of Classification Search
CPC combination set(s) only.
See application file for complete search history.

(56) References Cited

U.S. PATENT DOCUMENTS 5,267,320 A 11/1993 Fukumizu
5,748,748 A 5/1998 Fischer et al.
(Continued)

FOREIGN PATENT DOCUMENTS

DE 19531 402 A1 2/1997
DE 103 22 458 A1 12/2004
(Continued)

OTHER PUBLICATIONS

JP, 2007-296886,A, Noise Reducing device and method, Yoshiro, 2007, 1-32 (Translation) (Year: 2007).*
(Continued)

*Primary Examiner* — Duc Nguyen
*Assistant Examiner* — Assad Mohammed
(74) *Attorney, Agent, or Firm* — Birch, Stewart, Kolasch & Birch, LLP

(57) ABSTRACT

A sound signal control device in a device including an input transducer to detect sound in a space in a vehicle, a sensor to image an occupant in the space, and an output transducer to emit sound into the space includes: a controller to generate information indicating a position of a head of the occupant and information indicating a state of the occupant, based on an image imaged by the sensor; a processor to generate a cancellation signal for cancelling noise at the position based on a sound signal representing sound detected by the input transducer and the information, and generate a control signal for controlling sound at the position based on the cancellation signal; and a converter to cause the output transducer to emit a sound corresponding to the control signal. The processor adjusts a degree to which the noise is cancelled, based on the information indicating the state.

13 Claims, 15 Drawing Sheets

(51) Int. Cl.
*B60R 11/02* (2006.01)
*G06T 7/00* (2017.01)
*H04R 3/12* (2006.01)
*H04R 5/04* (2006.01)

(52) U.S. Cl.
CPC .............. *G06T 7/0012* (2013.01); *G06T 7/70* (2017.01); *H04R 3/12* (2013.01); *H04R 5/04* (2013.01); *G06T 2207/30196* (2013.01); *G06T 2207/30268* (2013.01); *H04R 2400/01* (2013.01); *H04R 2499/13* (2013.01)

(56) References Cited

U.S. PATENT DOCUMENTS

| | | | | |
|---|---|---|---|---|
| 6,654,054 | B1* | 11/2003 | Embler | H04N 5/3577 348/241 |
| 10,106,080 | B1* | 10/2018 | Hassani | B60N 2/0244 |
| 2007/0182529 | A1 | 8/2007 | Dobler et al. | |
| 2007/0233478 | A1* | 10/2007 | Sakamoto | G10K 11/17825 704/233 |
| 2011/0261970 | A1* | 10/2011 | Hamelink | G10K 15/02 381/71.4 |
| 2012/0269358 | A1* | 10/2012 | Gee | G10K 11/17885 381/71.4 |
| 2014/0226831 | A1 | 8/2014 | Tzirkel-Hancock et al. | |
| 2014/0270243 | A1* | 9/2014 | Bennett | A61B 5/18 381/86 |
| 2014/0294210 | A1* | 10/2014 | Healey | G06F 3/165 381/302 |
| 2016/0329040 | A1 | 11/2016 | Whinnery | |
| 2016/0379620 | A1* | 12/2016 | Warkentin | G10K 11/17875 381/71.4 |
| 2019/0251948 | A1 | 8/2019 | Hayashi et al. | |

FOREIGN PATENT DOCUMENTS

| | | | |
|---|---|---|---|
| DE | 10 2014 201 228 A1 | 8/2014 | |
| JP | 5-11771 A | 1/1993 | |
| JP | 8-76772 A | 3/1996 | |
| JP | 2007-296886 A | 11/2007 | |
| JP | 2007-296887 A | 11/2007 | |
| JP | 2007296886 A * | 11/2007 | |
| JP | 2008-149922 A | 7/2008 | |
| JP | 2016-19237 A | 2/2016 | |
| JP | WO-2017175448 A1 * | 10/2017 | ....... G10K 11/17819 |
| WO | WO 2017/175448 A1 | 10/2017 | |

OTHER PUBLICATIONS

WO2017175448, (translation) Oct. 12, 2017, pp. 1-26, Hayashi, Signal processing device, signaling processsing method and program. (Year: 2017).*

Pawelczyk, "Active Noise Control—A Review of Control-related Problems," Archives of Acoustics, vol. 33, No. 4, 2008, pp. 509-520.

Petersen et al., "Active Noise Control at a Moving Location Using Virtual Sensing," ICSV13—Vienna, Austria, Jul. 2-6, 2006, 8 pages.

Office Action dated May 25, 2021 in corresponding German Application No. 11 2017 008 159.9.

* cited by examiner

SOUND SIGNAL CONTROL DEVICE AND METHOD, AND RECORDING MEDIUM

TECHNICAL FIELD

The present invention relates to a sound signal control device and method, and a program and a recording medium for controlling sound in a space.

BACKGROUND ART

Active noise control (ANC) that detects noise in a space with a microphone, outputs antiphase sound from a speaker, and thereby cancels and reduces the noise is conventionally known.

The noise reduction effect increases as the microphone is located closer to a position at which noise is to be reduced. Thus, for example, for active noise reduction in a vehicle interior, there is a noise control device that has a microphone located in a headrest and changes characteristics of a model depending on the position or angle of a seat, thereby successfully cancelling noise regardless of changes in the position or angle of the seat (see Patent Literature 1).

CITATION LIST

Patent Literature

Patent Literature 1: Japanese Patent Application Publication No. 2008-149922 (pages 4 to 6 and FIG. 1)

Non Patent Literature

Non Patent Literature 1: M. Pawelczysk, "Active Noise Control—A Review of Control-Related Problems," Archives of Acoustics, 33, 4, 509-520 (2008)

Non Patent Literature 2: C. D. Petersen et al., "ACTIVE NOISE CONTROL AT A MOVING LOCATION USING VIRTUAL SENSING" ICSV13-Jul. 2-6, 2006

SUMMARY OF INVENTION

Technical Problem

The above noise control device described in Patent Literature 1 has a problem in that a change in the position of the head due to a change in the posture of the occupant decreases the noise reduction effect.

Although the above describes noise reduction in a vehicle interior, the same problem exists in noise reduction in spaces, such as a living room, an office room, and a workshop, other than the vehicle interior.

The present invention has been made to solve the above problem, and is intended to prevent the noise reduction effect from decreasing due to a change in the position of the head of the person.

Solution to Problem

A sound signal control device according to the present invention is a sound signal control device in a sound control device including an input sound transducer to detect sound in a space, an image sensor to image a person in the space, and an output sound transducer to perform emission into the space, the sound signal control device including: a controller to generate information indicating a position of a head of the person on a basis of an image imaged by the image sensor; a sound signal processor to generate a control signal for controlling sound at the position of the head of the person on a basis of a collected sound signal representing the sound detected by the input sound transducer and the information indicating the position of the head of the person; and an output signal converter to cause the output sound transducer to emit a sound corresponding to the control signal into the space.

Advantageous Effects of Invention

In the sound signal control device of the present invention, on the basis of the collected sound signal representing the sound detected by the input sound transducer and the information indicating the position of the head of the person generated on the basis of the imaged image, the sound signal processor generates the control signal for controlling the sound at the position of the head. Thus, it is possible to prevent the noise reduction effect from decreasing due to a change in the position of the head of the person.

DESCRIPTION OF EMBODIMENTS

Figure 1:
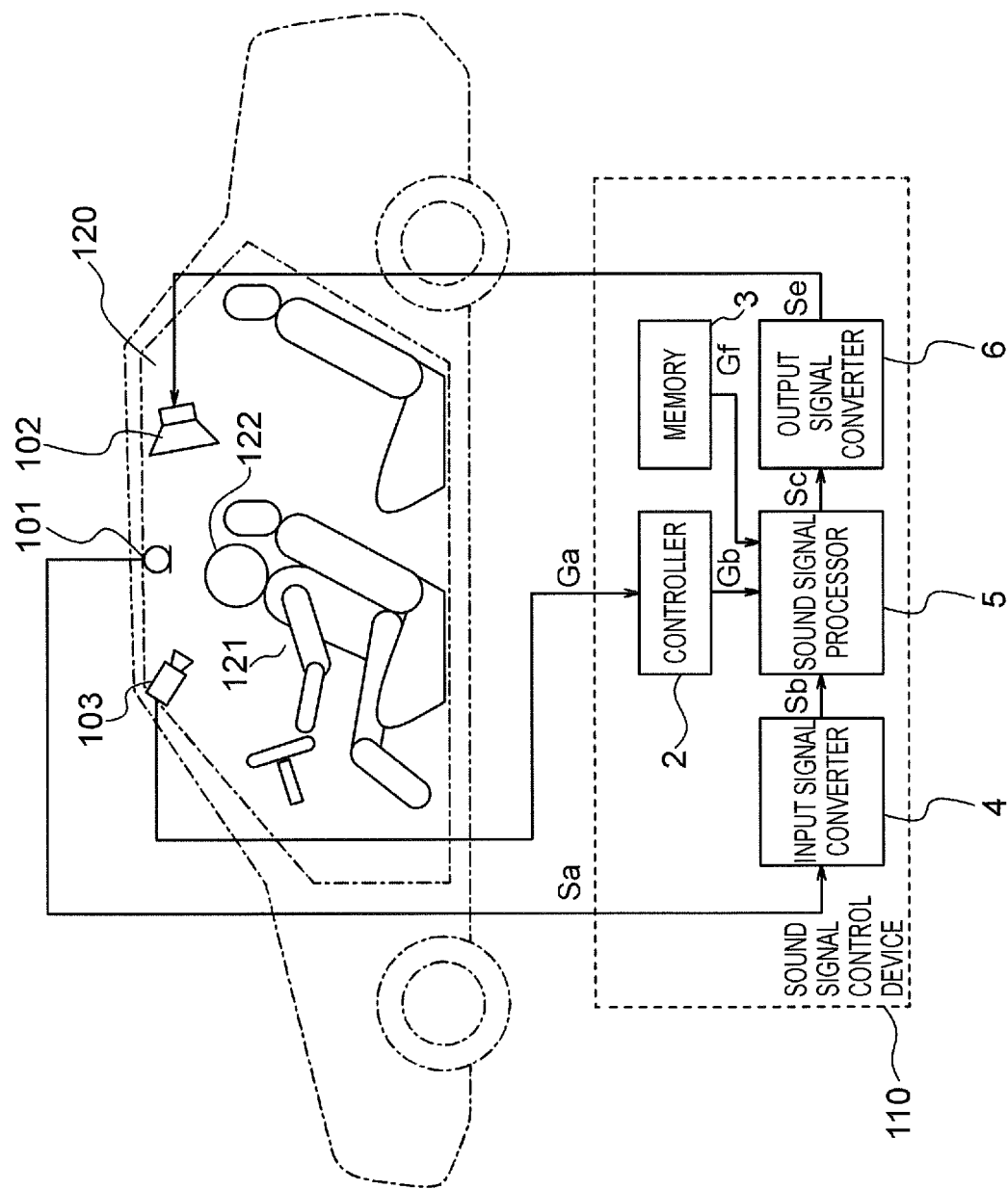
FIG. 1 is a block diagram illustrating a sound control device including a sound signal control device of a first embodiment of the present invention.

Embodiments of the present invention will be described below with reference to the attached drawings. In the drawings, components assigned the same reference characters have the same configurations or functions.

First Embodiment

FIG. 1 illustrates a sound control device 1 including a sound signal control device 110 of a first embodiment of the present invention. The sound control device 1 illustrated in FIG. 1 includes, besides the sound signal control device 110, a microphone 101 as an example of an input sound transducer, a speaker 102 as an example of an output sound transducer, and an image sensor 103.

The sound signal control device 110 includes a controller 2, a memory 3, an input signal converter 4, a sound signal processor 5, and a output signal converter 6.

The sound control device 1 of this embodiment performs, as a sound control, reduction of noise in a space by ANC. The space here is, for example, a vehicle interior, a living room, an office room, a conference room, or a workshop. The following description assumes that the space is a vehicle interior (space in a vehicle) 120 and noise heard by an occupant, for example a driver 121, of the vehicle is reduced, as illustrated in FIG. 1.

Noises to be reduced include motor noise, road noise, and the like. The following description assumes that motor noise is reduced.

The microphone 101 detects sound Aa in the vehicle interior. The microphone 101 is, for example, a single-channel (monaural) microphone. The microphone 101 outputs an electrical signal Sa representing the detected sound Aa.

The input signal converter 4 analog/digital (A/D) converts the signal Sa output from the microphone 101 by sampling it at a predetermined sampling frequency (e.g., 16 kHz) and outputs a discrete signal Sb in the time domain.

The input signal converter 4 outputs a series of 160 sampled values as one frame, for example.

Signals obtained by the sampling may be given "(n)" to indicate the sampling time or number and denoted by, for example, "Sb(n)". The same applies to other signals described below.

The signal Sa output from the microphone 101 and the signal Sb output from the input signal converter 4 are both signals obtained by sound collection by the microphone 101 and referred to as collected sound signals.

The image sensor 103 is or includes, for example, a camera that performs imaging with visible light or infrared light. The camera preferably has a function of measuring distances to respective portions of an object by means of, for example, ultrasound or laser light. The image sensor 103 outputs, as object information Ga, a combination of an imaged image and information indicating distances to respective portions of an object.

The controller 2 analyzes the object information Ga output by the image sensor 103 and outputs information (position information) Gb indicating the position of a head 122 of a person in the space. The information Gb indicating the position of the head 122 may be information indicating the position of one of the ears. The controller 2 outputs the position information Gb to the sound signal processor 5.

The sound signal processor 5 receives the collected sound signal Sb output by the input signal converter 4 and the position information Gb output by the controller 2, generates a signal (cancellation sound signal) Sc for cancelling the noise at the position of the head 122, and outputs the cancellation sound signal Sc as a control signal. While the cancellation sound signal Sc is a signal generally opposite in phase to the collected sound signal Sb, it is a signal subjected to adjustment taking into account the difference between the position of the microphone 101 and the position of the head 122 or the like.

The output signal converter 6 D/A converts the control signal Sc into a drive signal Se in analog form and drives the speaker 102 with the drive signal Se.

The output signal converter 6 performs amplification using a power amplifier or the like and drives the speaker 102 with the amplified signal as needed.

The speaker 102 converts the drive signal (electrical signal) Se from the output signal converter 6 into sound Ae and emits the sound into the space.

Figure 2:
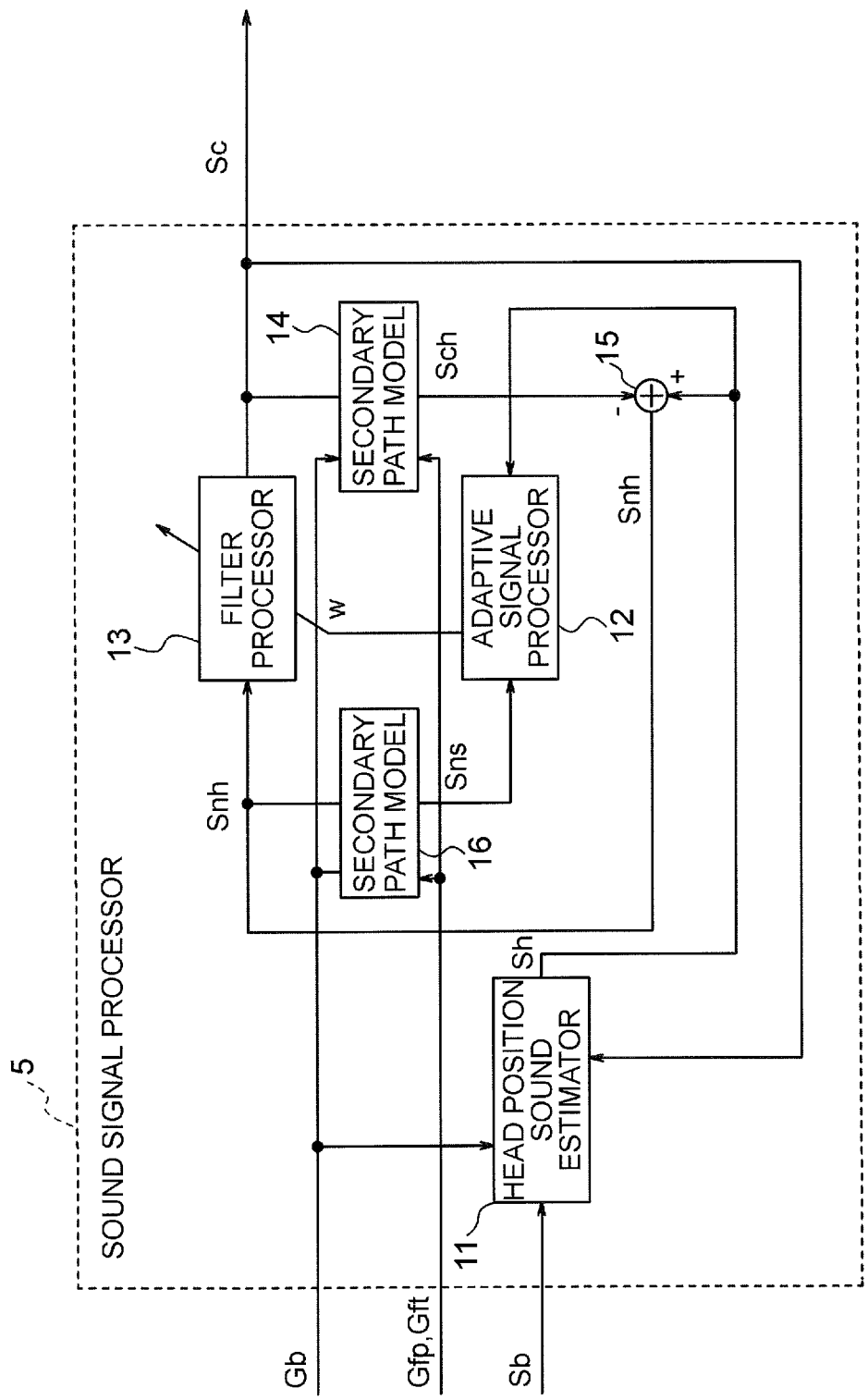
FIG. 2 is a block diagram illustrating a sound signal processor in the sound signal control device of FIG. 1.

FIG. 2 is a block diagram illustrating a configuration example of the sound signal processor 5.

By using virtual sensing technology, the illustrated sound signal processor 5 estimates sound at the position of the head 122 of the driver 121, estimates the sound (secondary sound) at the head position corresponding to the cancellation sound signal Sc output from the sound signal processor 5, and from these estimates, estimates the noise (primary sound) at the head position, and generates or updates the cancellation sound signal Sc on the basis of the estimated noise at the head position. Since in the ANC, control is performed so that the sound at the head position becomes zero, the sound at the head position may be referred to as an error sound, and a signal representing the error sound may be referred to as an error signal.

In the processing for generating the cancellation sound signal Sc on the basis of the estimated noise at the head position, for example, a finite impulse response (FIR) filter is used, and a set of filter coefficients is updated so that the error sound (superposition of the noise and cancellation sound) at the head position approaches zero. The update of the set of filter coefficients is performed using, for example, a filtered-X algorithm.

The sound signal processor 5 estimates the primary sound (noise) at the head position from an estimate of the error sound at the head position and an estimate of the secondary sound (cancellation sound) at the head position, and determines the cancellation sound signal Sc on the basis of the result of the estimation. Such control is called feedback control.

Virtual sensing technology is used in a situation as below. When noise reaching the ears of a person is eliminated by ANC, it is necessary to detect the position of the head of the person and estimate sound at the position. If it is possible to place microphones at sufficiently high density in an area in which the head of the person is expected to move, it is possible to estimate, as the sound reaching the ears of the person, the sound detected by the microphone closest to the position of the head, at each time.

However, placing microphones at high density has problems, such as interfering with movement of the head, and increasing the device cost. Thus, a technique has been proposed that places a microphone in an area in which the head is expected to move or at a position close thereto and estimates sound at the actual position of the head at each time from sound detected by the microphone. This technique is called virtual sensing. Virtual sensing is detailed in the above-described Non Patent Literatures 1 and 2.

The sound signal processor 5 estimates the sound at the head position by virtual sensing on the basis of the collected sound signal Sb obtained by the microphone 101 and the information Gb indicating the position of the head 122 generated by the controller 2, and generates the cancellation sound signal Sc by ANC on the basis of the estimate.

The sound signal processor 5 of FIG. 2 includes a head position sound estimator 11, an adaptive signal processor 12, a filter processor 13, secondary path models 14 and 16, and an adder 15.

The head position sound estimator 11 generates a head position sound signal Sh on the basis of the collected sound signal Sb and control signal Sc. The head position sound signal Sh represents an estimate of the sound at the head position corresponding to the collected sound signal Sb.

The adaptive signal processor 12 updates a set of filter coefficients used in the filter processor 13 on the basis of the head position sound signal Sh generated by the head position sound estimator 11 and the like. An output of the filter processor 13 is the cancellation sound signal Sc.

The secondary path model 14, which is a model having an estimate of a transfer function between the speaker 102 and the head 122, receives the cancellation sound signal Sc and outputs a head position secondary sound signal Sch. The head position secondary sound signal Sch represents an estimate of the sound (secondary sound) at the head position corresponding to the control signal Sc.

The transfer function of the secondary path model 14 is determined and updated on the basis of the information Gb indicating the position of the head 122, information Gft representing transfer functions for multiple fixed positions, and information (e.g., coordinates representing positions in the space) Gfp representing the fixed positions. The information Gft and Gfp will be described later.

The adder 15 subtracts the head position secondary sound signal Sch from the head position sound signal Sh, thereby generating a head position primary sound signal Snh. The head position primary sound signal Snh represents an estimate of the primary sound (noise) at the head position.

The filter processor 13, which is or includes, for example, a finite impulse response (FIR) filter, performs filter processing on the head position primary sound signal Snh by using the set (coefficient vector) w of filter coefficients sequentially updated by the adaptive signal processor 12 and outputs the cancellation sound signal Sc.

The secondary path model 16, which is a model having an estimate of a transfer function between the speaker 102 and the head 122, receives the head position primary sound signal Snh and outputs a speaker position primary sound signal Sns. The speaker position primary sound signal Sns represents an estimate of the primary sound (noise) at the position of the speaker 102 corresponding to the head position primary sound signal Snh.

The transfer function of the secondary path model 16 is also determined and updated on the basis of the information Gb indicating the position of the head 122, the information Gft representing the transfer functions for the multiple fixed positions, and the information Gfp representing the fixed positions.

The adaptive signal processor 12 sequentially updates the set w of filter coefficients used in the filter processor 13 on the basis of the speaker position primary sound signal Sns and head position sound signal Sh.

The update by the adaptive signal processor 12 is performed so that the head position sound signal Sh approaches zero. Specifically, the set w of filter coefficients is sequentially updated so that the primary sound (noise) is completely cancelled at the head position by the sound (cancellation sound) emitted from the speaker 102 according to the control signal Sc.

The update of the set w of filter coefficients is performed by, for example, a filtered-X algorithm. In the filtered-X algorithm, the update of the set w of filter coefficients is performed by, for example, a calculation represented by the following equation (1):

$$w(n+1) = w(n) + \mu \cdot Sh(n) \cdot Sns(n). \quad (1)$$

In equation (1), $\mu$ is a step size parameter that adjusts the convergence speed of the adaptive operation and the estimation accuracy, and is determined depending on the sound field environment;

w is a set (vector) consisting of multiple filter coefficients $w_0, w_1, w_2, \ldots$;

$Sh(n)$, $Sns(n)$, and $w(n)$ respectively denote the values of Sh, Sns, and w at sampling time n;

$w(n)$ denotes the values of the set w of filter coefficients before the update; and $w(n+1)$ denotes the values of the set w of filter coefficients after the update, i.e., the values of the set w of filter coefficients to be used for the data at the time subsequent to time n.

The transfer function of the secondary path models 14 and 16 need to be changed depending on the position of the head 122. In this embodiment, transfer functions from the speaker 102 to the multiple (specifically, Q) fixed positions (fixed set positions) are obtained by previous learning; information Gft representing the obtained transfer functions and information Gfp representing the (Q) fixed positions are previously stored in the memory 3; and the transfer function of the path (secondary path) from the speaker 102 to the position of the head 122 is determined by performing an interpolation on the basis of the information Gb indicating the position of the head 122 from the controller 2 and the information Gfp and Gft stored in the memory 3

The fixed positions are arranged in a control target space. The control target space is defined to occupy an area in which the head 122 can be located or is likely to be located while the sound control is being performed by the sound control device.

In the previous learning, for example, a microphone is actually placed at each fixed position; sound emitted from the speaker 102 is detected by each microphone; transfer functions from the speaker 102 to the fixed positions are determined; and information Gft representing the determined transfer functions is stored together with information Gfp representing each fixed position.

Figure 3:
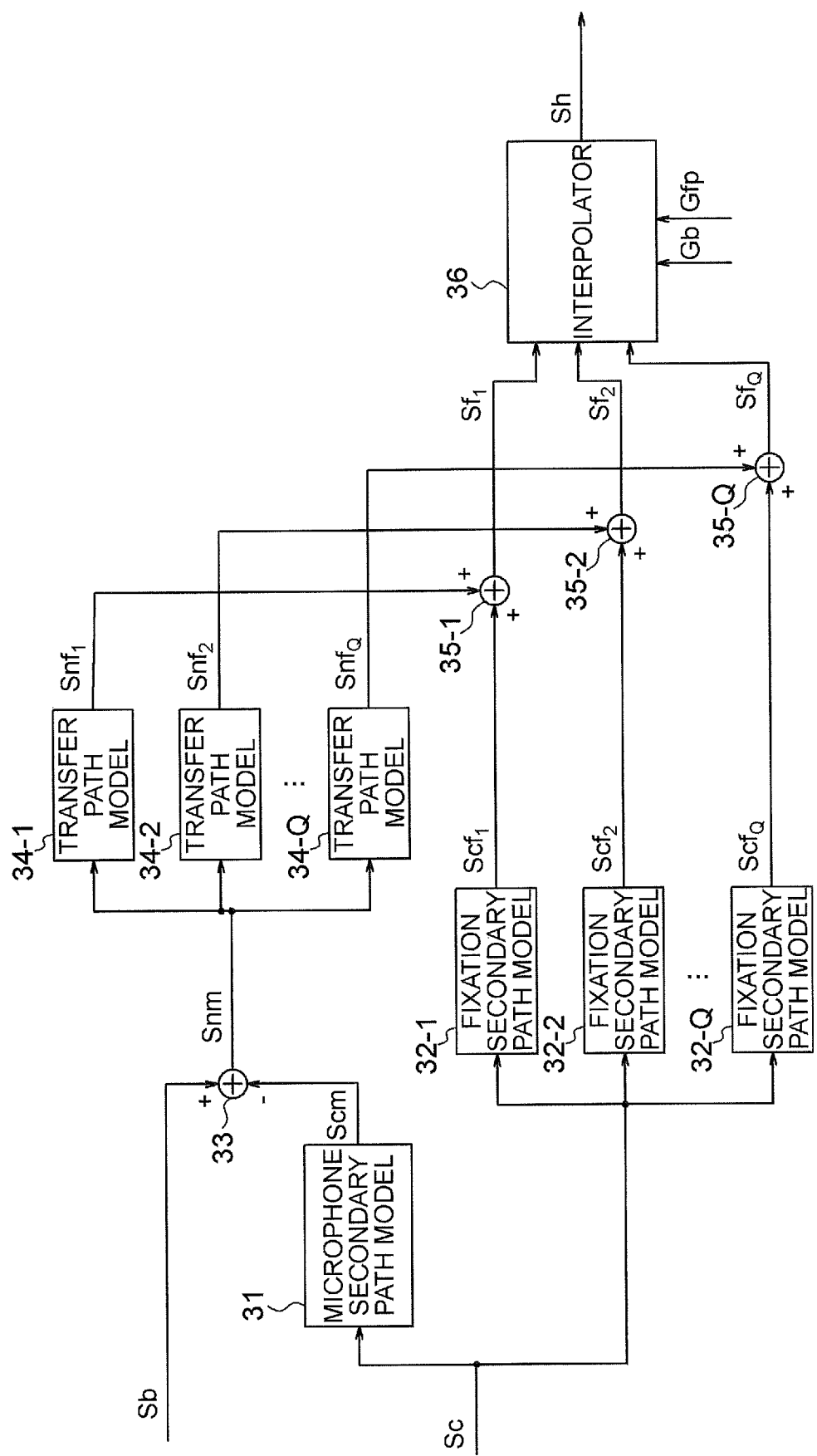
FIG. 3 is a block diagram illustrating a head position sound estimator of FIG. 2.

FIG. 3 is a block diagram illustrating an example of the head position sound estimator 11. The illustrated head position sound estimator 11 includes a microphone secondary path model 31, first to Qth fixed position secondary path models 32-1 to 32-Q, an adder 33, first to Qth transfer path models 34-1 to 34-Q, first to Qth adders 35-1 to 35-Q, and an interpolator 36.

The microphone secondary path model 31, which is a model having an estimate of a transfer function between the speaker 102 and the microphone 101, receives the control signal Sc and generates a microphone position secondary sound signal Scm. The microphone position secondary sound signal Scm represents an estimate of the sound (secondary sound) at the position of the microphone 101 corresponding to the control signal Sc.

The first to Qth fixed position secondary path models 32-1 to 32-Q, which are models having estimates of transfer functions between the speaker 102 and the first to Qth fixed positions, receive the control signal Sc and generate first to Qth fixed position secondary sound signals $Scf_1$ to $Scf_Q$. The first to Qth fixed position secondary sound signals $Scf_1$ to $Scf_Q$ respectively represent estimates of the sounds (secondary sounds) at the first to Qth fixed positions corresponding to the control signal Sc.

The adder 33 subtracts the microphone position secondary sound signal Scm from the collected sound signal Sb, thereby generating a microphone position primary sound signal Snm. The microphone position primary sound signal Snm represents an estimate of the primary sound (noise) at the position of the microphone 101.

The first to Qth transfer path models 34-1 to 34-Q, which are models having estimates of transfer functions between the microphone 101 and the first to Qth fixed positions, receive the microphone position primary sound signal Snm and output first to Qth fixed position primary sound signals $Snf_1$ to $Snf_Q$. The first to Qth fixed position primary sound signals $Snf_1$ to $Snf_Q$ respectively represent estimates of the primary sounds at the first to Qth fixed positions corresponding to the microphone position primary sound signal Snm.

The first to Qth adders 35-1 to 35-Q add the first to Qth fixed position primary sound signals $Snf_1$ to $Snf_Q$ and the first to Qth fixed position secondary sound signals $Scf_1$ to $Scf_Q$, thereby generating first to Qth fixed position sound signals $Sf_1$ to $Sf_Q$, respectively. The first to Qth fixed position sound signals $Sf_1$ to $Sf_Q$ respectively represent estimates of the sounds (superpositions of the primary sounds and secondary sounds) at the first to Qth fixed positions.

The interpolator 36 performs an interpolation using the first to Qth fixed position sound signals $Sf_1$ to $Sf_Q$, the information Gfp representing the fixed positions read from the memory 3, and the information Gb indicating the position of the head 122 provided from the controller 2, thereby generating the head position sound signal Sh. The head position sound signal Sh represents an estimate of the sound (superposition of the primary sound and secondary sound) at the head position.

The transfer function of each of the microphone secondary path model 31, the first to Qth fixed position secondary path models 32-1 to 32-Q, and the first to Qth transfer path models 34-1 to 34-Q is previously obtained, and each model is configured to have the obtained transfer function.

In the sound signal processor 5 in this embodiment, the operation has been described by taking, as an example, feedback control using a filtered-X algorithm. However, this is not mandatory, and it is possible to use known methods, such as wave synthesis, which is processing on the frequency axis.

Figure 4:
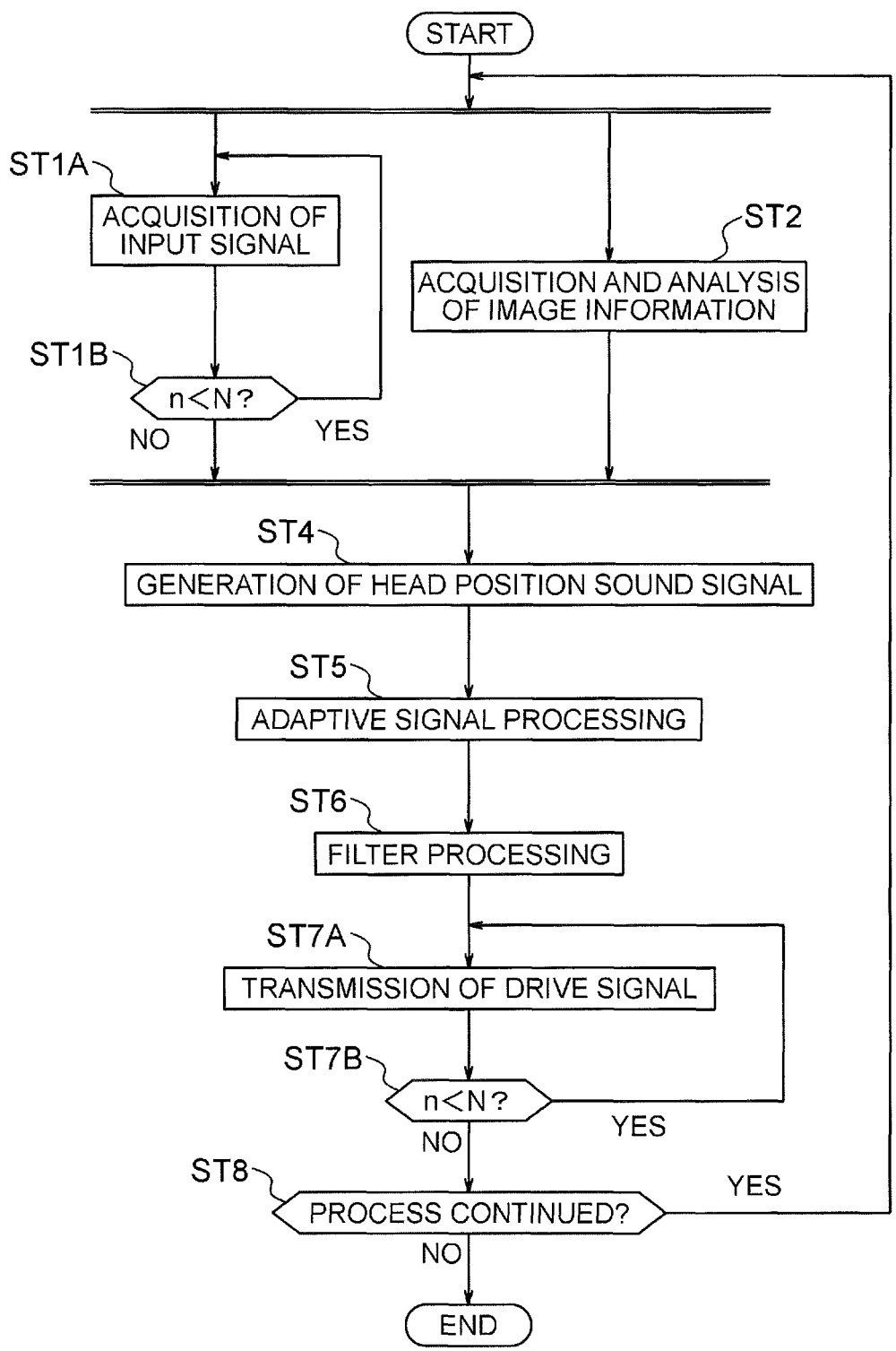
FIG. 4 is a flowchart illustrating the procedure of a process of the sound signal control device of the first embodiment.

Next, the procedure of a process in the above-described sound signal control device will be described with reference to the flowchart of FIG. 4.

The combination of steps ST1A and ST1B can be performed in parallel with step ST2.

In step ST1A, the input signal converter 4 A/D converts the analog collected sound signal Sa picked up by the microphone 101 by sampling it at the predetermined sampling frequency, thereby generating the digital collected sound signal Sb in the time domain.

In step ST1B, it is determined whether the number n of sampled values has reached a predetermined number N, and if not, it returns to step ST1A. If n has reached N, it proceeds to step ST4. N is, e.g., 160, and denotes the number of sampled values in one frame. N sampled values form collected sound signals (Sb(1) to Sb(160)) of one frame.

In step ST2, the controller 2 receives the image imaged by the image sensor 103, analyzes the image (step ST2), and on the basis of the result, generates the information Gb indicating the position of the head 122 of the driver.

Upon completion of the combination of steps ST1A and ST1B and the processing of step ST2, it proceeds to step ST4.

In step ST4, the head position sound estimator 11 generates the head position sound signal Sh on the basis of the information Gb indicating the position of the head 122, the collected sound signal Sb, and the control signal Sc.

In step ST5, the adaptive signal processor 12 receives the speaker position primary sound signal Sns output from the secondary path model 16 and the head position sound signal Sh output by the head position sound estimator 11, and updates the set of coefficients of the filter processor 13 so that the head position sound signal Sh approaches zero.

In step ST6, the filter processor 13 performs filter processing on the head position primary sound signal Snh by using the set of filter coefficients updated by the adaptive signal processor 12 to generate the cancellation sound signal Sc and outputs it as the control signal.

In step ST7A, the output signal converter 6 receives the control signal Sc output by the sound signal processor 5, and performs conversion into an analog signal, amplification, or the like, thereby generating and outputting the signal Se for driving the speaker 102. This processing is also performed for each frame, as in step ST1A. Specifically, in step ST7B subsequent to step ST7A, it is determined whether the number n of data items (control signals Sc generated correspondingly to sampled values in step ST1B) has reached N, and if not, it returns to step ST7A. If n has reached N, it is determined that the processing of the frame has been completed, and it proceeds to step ST8.

In step ST8, it is determined whether the sound control is to be continued. If it is to be continued (Yes in ST8), it returns to steps ST1A and ST2.

If it is to be terminated (NO in step ST8), the process is terminated.

In the first embodiment, the cancellation sound signal Sc for cancelling the noise is generated and output as the control signal, and a sound corresponding to the control signal is emitted from the speaker 102 into the space in the vehicle interior. Thus, it is possible to cancel the noise heard by the driver regardless of changes in the position of the head of the driver. Also, the noise is estimated by a feedback system. Specifically, the noise (Snh) at the head position is estimated from an estimate (Sh) of the sound at the head position based on the collected sound signal Sb and an estimate (Sch) of the sound at the head position corresponding to the control signal (Sc). Then, the cancellation sound signal (Sc) is generated on the basis of the estimated noise (Snh) at the head position. Thus, it is possible to cancel the noise if it is not known in advance what kind of noise is emitted.

Second Embodiment

While in the first embodiment, control is performed so that the noise is completely cancelled, the following describes, as a second embodiment, a configuration that, when the attention of the driver is decreased, adjusts the degree of noise reduction depending on the degree of the decrease.

Figure 5:
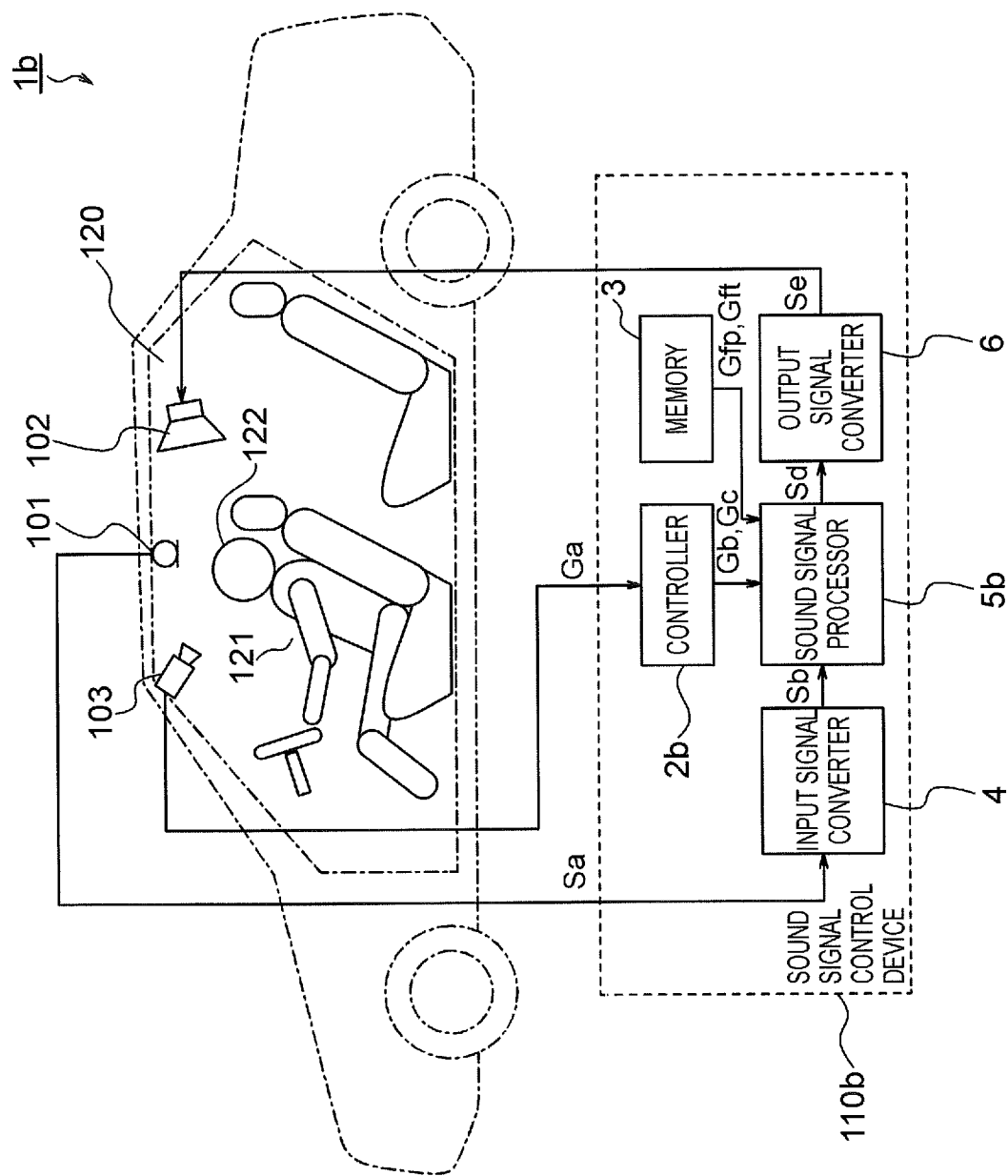
FIG. 5 is a block diagram illustrating a sound control device including a sound signal control device of a second embodiment of the present invention.

FIG. 5 illustrates a sound control device 1b including a sound signal control device 110b of the second embodiment. In FIG. 5, reference characters that are the same as those in FIG. 1 denote the same parts.

The sound signal control device 110b illustrated in FIG. 5 is generally the same as the sound signal control device 110 illustrated in FIG. 1. However, a controller 2b and a sound signal processor 5b are provided instead of the controller 2 and sound signal processor 5.

The controller 2b generates the information Gb indicating the position of the head 122 of the driver on the basis of the output of the image sensor 103, and further generates information (attention state information) Gc indicating an attention state of the driver.

Here, the attention state of the driver is, for example, the level of attention of the driver to driving. For example, when the driver is asleep or looking aside, it is determined that the attention is decreased. For example, when the driver has the eyes closed, when the driver opens and closes the eyes and the ratio of the time during which the eyes are closed is great, or when the head is swinging back and forth or from side to side, it is determined that the driver is asleep. Also, when the ratio of the time during which the driver is looking in directions other than the forward direction is great, it is determined that the driver is looking aside.

On the basis of these determinations, the controller 2b outputs the attention state information Gc.

The sound signal processor 5b receives not only the position information Gb but also the attention state information Gc from the controller 2b, performs, on the basis of the position information Gb, the same control (noise cancelling control) as in the first embodiment, and further performs control to adjust the degree of noise reduction on the basis of the attention state information Gc. For example, the degree of noise reduction is decreased as the attention decreases. When the degree of noise reduction is decreased, the driver hears the part (primary sound remainder) of the noise that has not been reduced.

Figure 6:
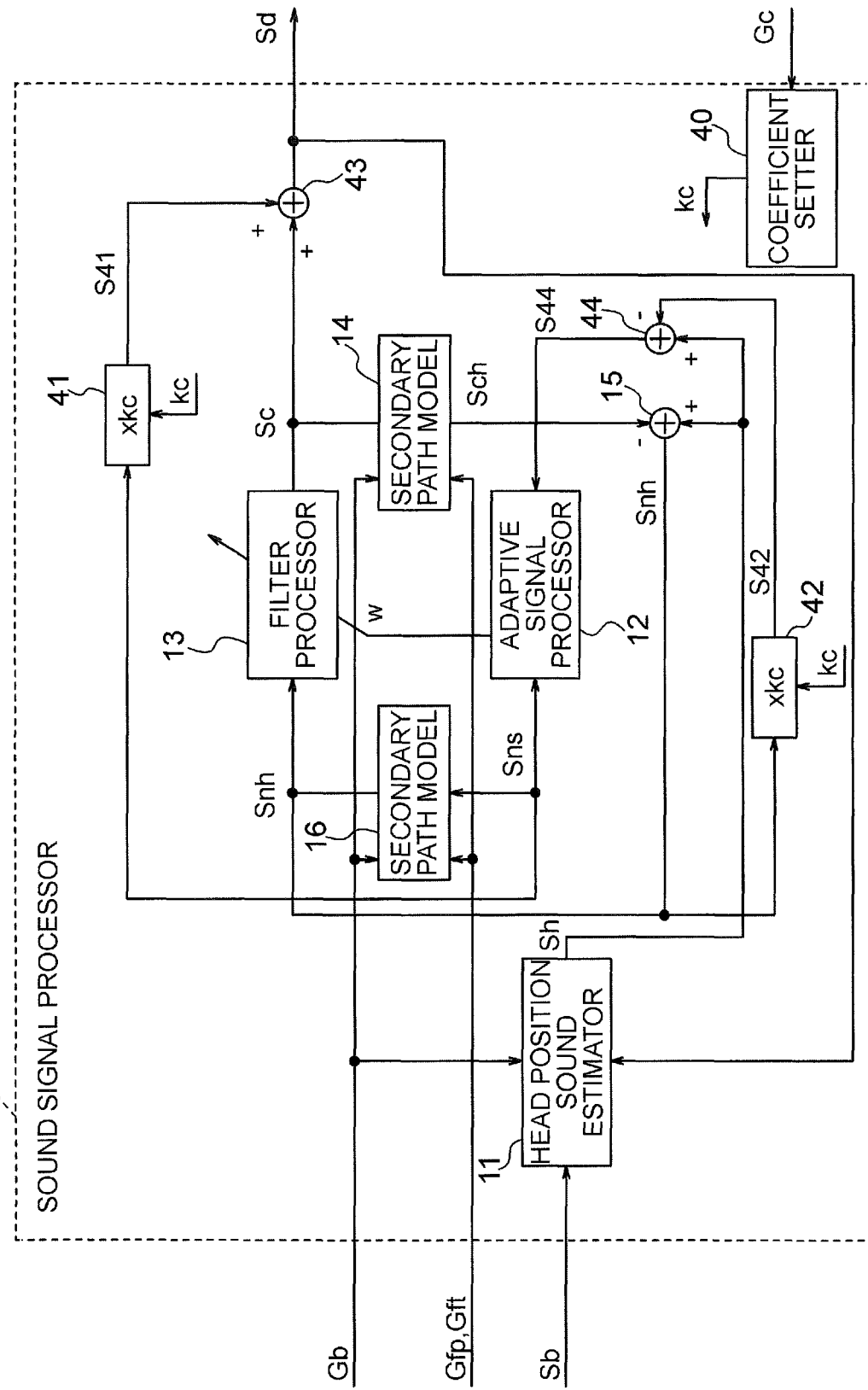
FIG. 6 is a block diagram illustrating a sound signal processor in the sound signal control device of FIG. 5.

The sound signal processor 5b used in the second embodiment is, for example, configured as illustrated in FIG. 6. The sound signal processor 5b illustrated in FIG. 6 is generally the same as the sound signal processor 5 of FIG. 2, but additionally includes a coefficient setter 40, coefficient multipliers 41 and 42, and adders 43 and 44.

Also, the cancellation sound signal output from the filter processor 13 is denoted by reference character Sc, and an output of the adder 43, which receives the cancellation sound signal Sc, is denoted by reference character Sd.

The coefficient setter 40 sets a coefficient (inattention coefficient) kc depending on the attention state information Gc. The inattention coefficient kc ranges from 0 to 1, and is set to a greater value as the attention indicated by the attention state information Gc decreases.

The coefficient multiplier 41 multiplies the speaker position primary sound signal Sns by the coefficient kc set by the coefficient setter 40. An output S41 (=kc·Sns) of the coefficient multiplier 41 is a signal representing the part of the primary sound (noise) that is not reduced, i.e., a signal representing the part (primary sound remainder) that is to be heard by the driver.

The adder 43 adds the output S41 of the coefficient multiplier 41 to the cancellation sound signal Sc and outputs the addition result Sd (=kc·Sns+Sc). The output Sd of the adder 43 is a signal for reducing a part of the primary sound and allowing the remainder to be heard by the driver. The output Sd of the adder 43 is supplied to the output signal converter 6 as an output (control signal) of the sound signal processor 5b and supplied to the head position sound estimator 11.

Thereby, the speaker 102 is driven by the sum of the cancellation sound signal Sc and signal S41. Thus, the speaker 102 emits a sound that is weaker than the cancellation sound by an amount corresponding to the sound due to the signal S41, and the driver hears the part (part corresponding to the signal S41) of the noise.

Since the coefficient kc is increased as the attention decreases, the driver hears the noise louder as the attention decreases. This can recover the attention of the driver.

The head position sound estimator 11 receives the control signal Sd instead of the control signal Sc, and performs, on the collected sound signal Sb and control signal Sd, the same processing as described in the first embodiment, thereby generating the head position sound signal Sh. The head position sound signal Sh is the sum of the normal error signal (error signal in the case of leaving no noise) and an estimate of the remainder of the noise (primary sound) at the head position.

The coefficient multiplier 42 multiplies the head position primary sound signal Snh by the coefficient kc. An output S42 (=kc·Snh) of the coefficient multiplier 42 represents an estimate of the remainder of the primary sound at the head position.

The adder 44 subtracts the output S42 of the coefficient multiplier 42 from the head position sound signal Sh. The subtraction result represents a sound obtained by subtracting the primary sound remainder at the head position from the sound at the head position. This is because the sound represented by the head position sound signal Sh is the sum of the normal error sound (error sound in the case of leaving no noise) and the primary sound remainder at the head position, and the sound represented by the output S42 of the coefficient multiplier 42 represents the primary sound remainder at the head position, as described above.

The adaptive signal processor 12 updates the set w of filter coefficients so that an output S44 (=Sh−kc·Snh) of the adder 44 approaches zero.

The filter processor 13 performs filtering with the set w of filter coefficients updated by the adaptive signal processor 12 and outputs the cancellation sound signal Sc.

Since the adaptive signal processor 12 updates the filter coefficients so that the output S44 of the adder 44 approaches zero, as described above, the filter processor 13 outputs a signal representing a cancellation sound for noise reduction.

In the second embodiment, the information (Gc) indicating the level of attention of the driver to driving is generated on the basis of information such as the image obtained by the image sensor 103, and the degree to which the noise at the head position is cancelled is adjusted on the basis of the information (Gc) indicating the state of the driver. For example, when the information (Gc) indicating the state of the driver indicates that the attention is low, the degree of noise cancellation is decreased. This can recover the attention, contributing to safe driving.

Further, the effect is maintained regardless of changes in the position of the head due to driving operations or the like.

Third Embodiment

In the first and second embodiments, the noise (primary sound) is estimated on the basis of the sound collection by the microphone. In a third embodiment, on the basis of noise data that is generated and stored in advance, a signal representing the noise is generated. Since the signal (reference signal) representing the noise is generated from known data, it is called feedforward control. The following describes a case where the noise to be cancelled is sound (motor noise) occurring due to operation of a motor, as in the first embodiment.

Figure 7:
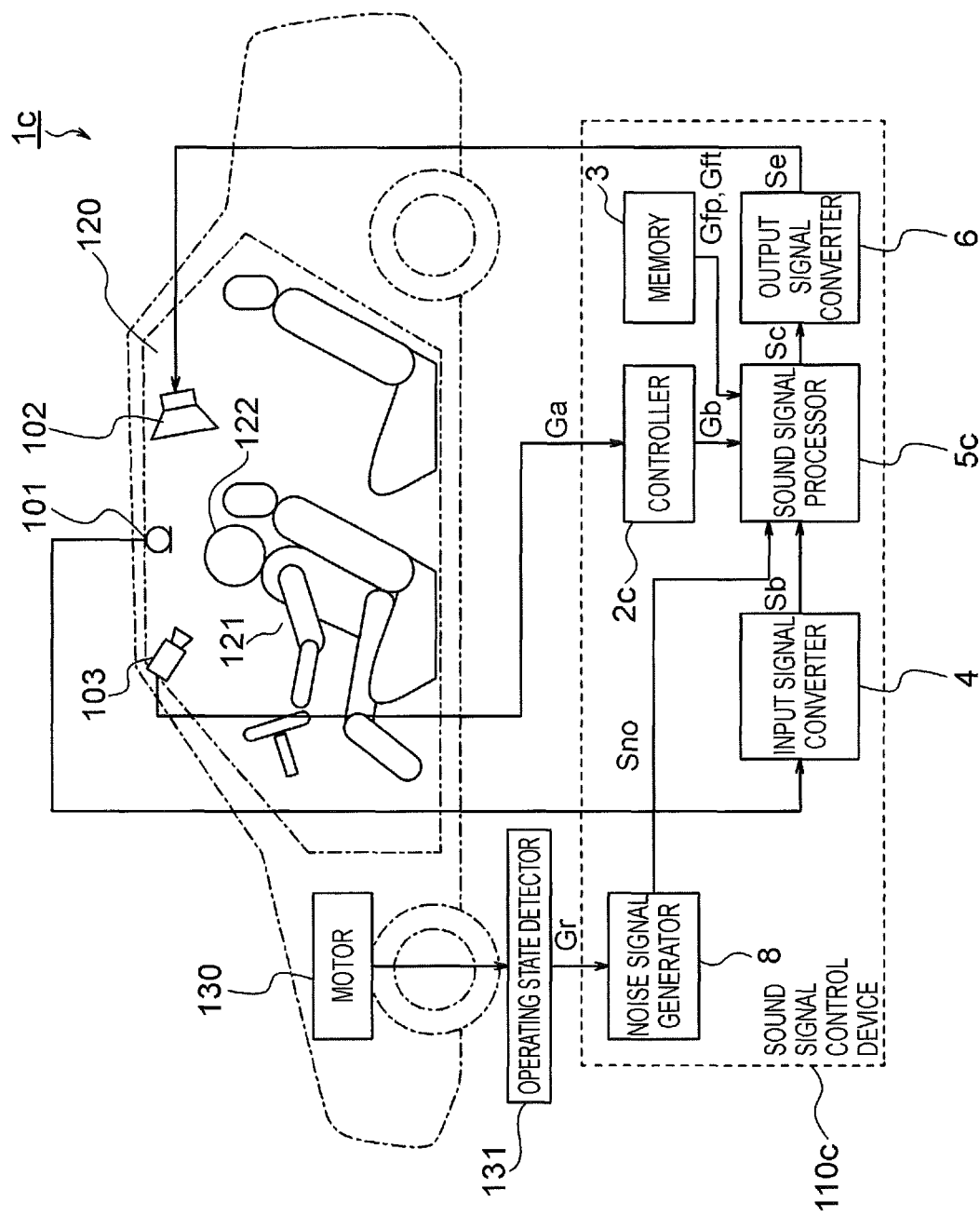
FIG. 7 is a block diagram illustrating a sound control device including a sound signal control device of a third embodiment of the present invention.

FIG. 7 illustrates, together with a motor 130, a sound control device 1c including a sound signal control device 110c of the third embodiment. In FIG. 7, reference characters that are the same as those in FIG. 1 denote the same parts.

The sound signal control device 110c illustrated in FIG. 7 is generally the same as the sound signal control device 110 illustrated in FIG. 1, but additionally includes a noise signal generator 8.

The motor 130 is, for example, an internal combustion engine, such as a gasoline engine, or an electric motor, and generates power for driving the automobile.

An operating state detector 131 outputs operating state information Gr indicating the operating state, e.g., the startup, stop, rotational speed, rotational phase, or the like, of the motor 130.

The noise signal generator 8 generates a motor noise signal Sno on the basis of previously stored data representing the noise and the operating state information Gr output from the operating state detector 131, and outputs it to a sound signal processor 5c. The motor noise signal Sno emulates the actual noise, and is, for example, a synthetic sound with the period of the rotation as the period of a fundamental frequency. Also, it takes into account the rotational phase. Further, for example, it varies in magnitude depending on the rotational speed. For example, it is configured so that the volume increases as the rotational speed increases.

For generation of the motor noise signal Sno, sound is collected when the motor 130 is actually driven, and the analysis of the collected sound is previously stored as data (motor noise data) representing the noise in a storage (not illustrated) in the noise signal generator 8. When the sound signal control device operates, the noise signal generator 8 generates the motor noise signal Sno on the basis of the data stored in the storage and the operating state information Gr from the operating state detector 131.

Figure 8:
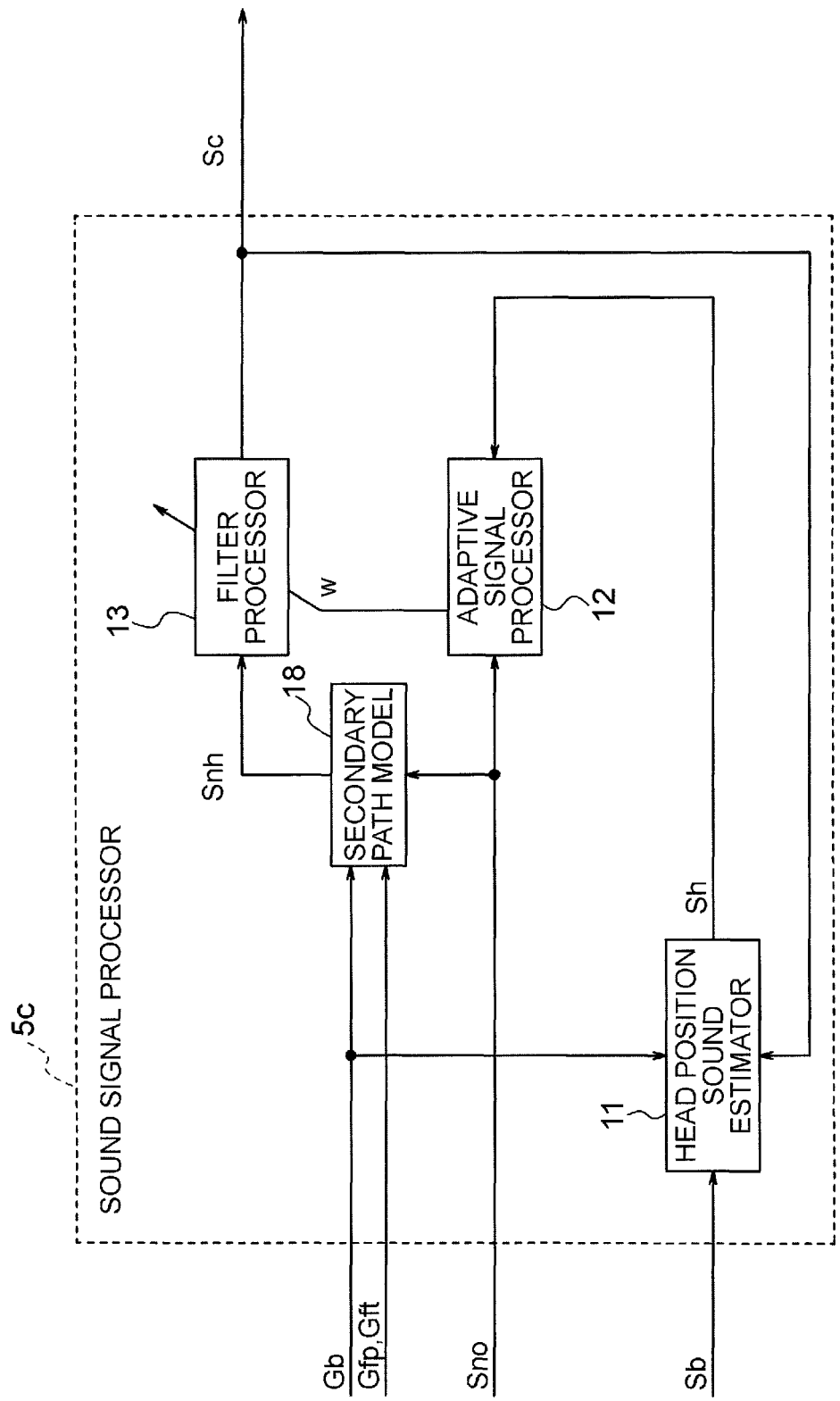
FIG. 8 is a block diagram illustrating a sound signal processor in the sound signal control device of FIG. 7.

FIG. 8 illustrates the sound signal processor 5c used in the third embodiment. The illustrated sound signal processor 5c includes the head position sound estimator 11, the adaptive signal processor 12, the filter processor 13, and a secondary path model 18.

The motor noise signal Sno output by the noise signal generator 8 is input into the secondary path model 18 and adaptive signal processor 12.

The secondary path model 18, which is a model having an estimate of a transfer function between the speaker 102 and the head 122, receives the motor noise signal Sno and outputs a head position primary sound signal Snh. The head position primary sound signal Snh represents an estimate of the sound (primary sound) at the head position corresponding to the motor noise signal Sno.

The adaptive signal processor 12 sequentially updates the set w of filter coefficients used in the filter processor 13 on the basis of the motor noise signal Sno and head position sound signal Sh. This update is performed so that the head position sound signal Sh approaches zero.

The update of the set w of filter coefficients is performed by, for example, a filtered-X algorithm. In the filtered-X algorithm, the update of the set w of filter coefficients is performed by, for example, a calculation represented by the following equation (2):

$$w(n+1)=w(n)-\mu \cdot Sh(n) \cdot Sno(n). \tag{2}$$

Although equation (2) is similar to the above-described equation (1), it has Sno(n) in place of Sns(n).

Sno(n) denotes the value of Sno at sampling time n.

The transfer function of the secondary path model 18 is also determined and updated on the basis of the information Gb indicating the position of the head 122, the information Gft representing the transfer functions for the multiple fixed positions, and the information Gfp representing the fixed positions.

In the third embodiment, the cancellation sound signal Sc for cancelling the noise at the position of the head of the driver is generated and output as the control signal, and a sound corresponding to the control signal is emitted from the speaker 102 into the space in the vehicle interior. Thus, it is possible to cancel the noise heard by the driver if the position of the head of the driver is changed. Also, the noise is estimated by a feedforward system. Specifically, the noise signal (Sno) representing the noise is generated on the basis of the previously stored data representing the noise. Then, the cancellation sound signal (Sc) is generated on the basis of the generated noise signal (Sno). Thus, it is possible to cancel the noise by using a sound signal processing device having a relatively simple configuration.

In the third embodiment, the output Sno of the noise signal generator 8 is handled as a signal representing a sound at the position of the speaker 102. However, it is also possible to handle it as a signal representing a sound at the position of the noise source (e.g., motor 130), and use a signal obtained by passing it through a model of a transfer path from the noise source to the position of the speaker 102, as a noise signal at the position of the speaker 102. For example, the output of the model may be input to the adaptive signal processor 12 and secondary path model 18 instead of the signal Sno. The same applies to fourth to seventh embodiments described below.

Fourth Embodiment

While in the third embodiment, control is performed so that the noise is completely cancelled, the following describes, as the fourth embodiment, a configuration that, when the attention of the driver is decreased, adjusts the degree of noise reduction depending on the degree of the decrease.

Figure 9:
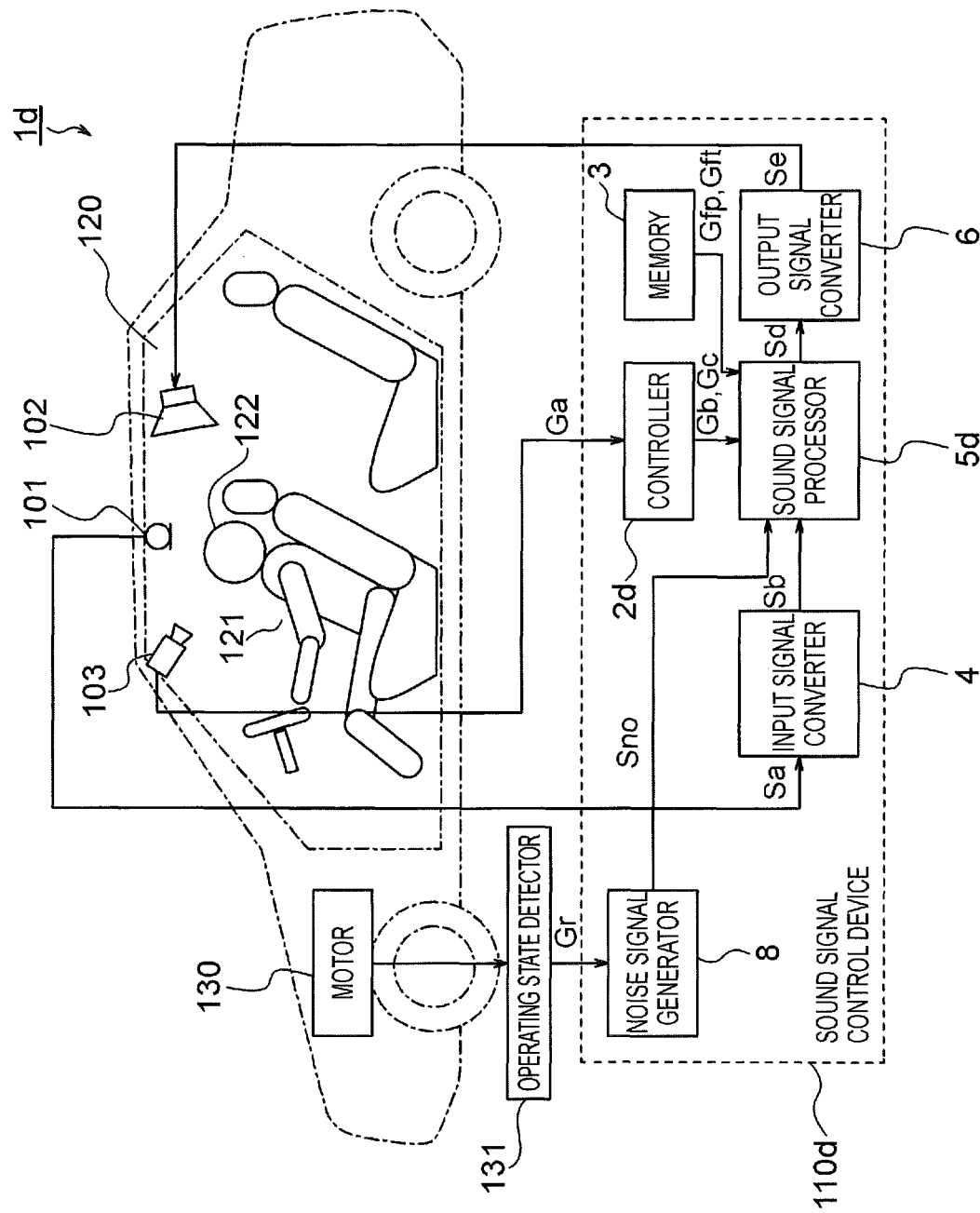
FIG. 9 is a block diagram illustrating a sound control device including a sound signal control device of a fourth embodiment of the present invention.

FIG. 9 illustrates a sound control device 1d including a sound signal control device 110d of the fourth embodiment. In FIG. 9, reference characters that are the same as those in FIG. 7 denote the same parts.

The sound signal control device 110d illustrated in FIG. 9 is generally the same as the sound signal control device 110c illustrated in FIG. 7. However, a controller 2d and a sound signal processor 5d are provided instead of the controller 2c and sound signal processor 5c.

The controller 2d generates the information Gb indicating the position of the head 122 of the driver on the basis of the output of the image sensor 103, and further generates the information Gc indicating the attention state of the driver, as with the controller 2b of the second embodiment.

The sound signal processor 5d adjusts the degree of noise reduction on the basis of the attention state information Gc, as with the sound signal processor 5b of the second embodiment.

Figure 10:
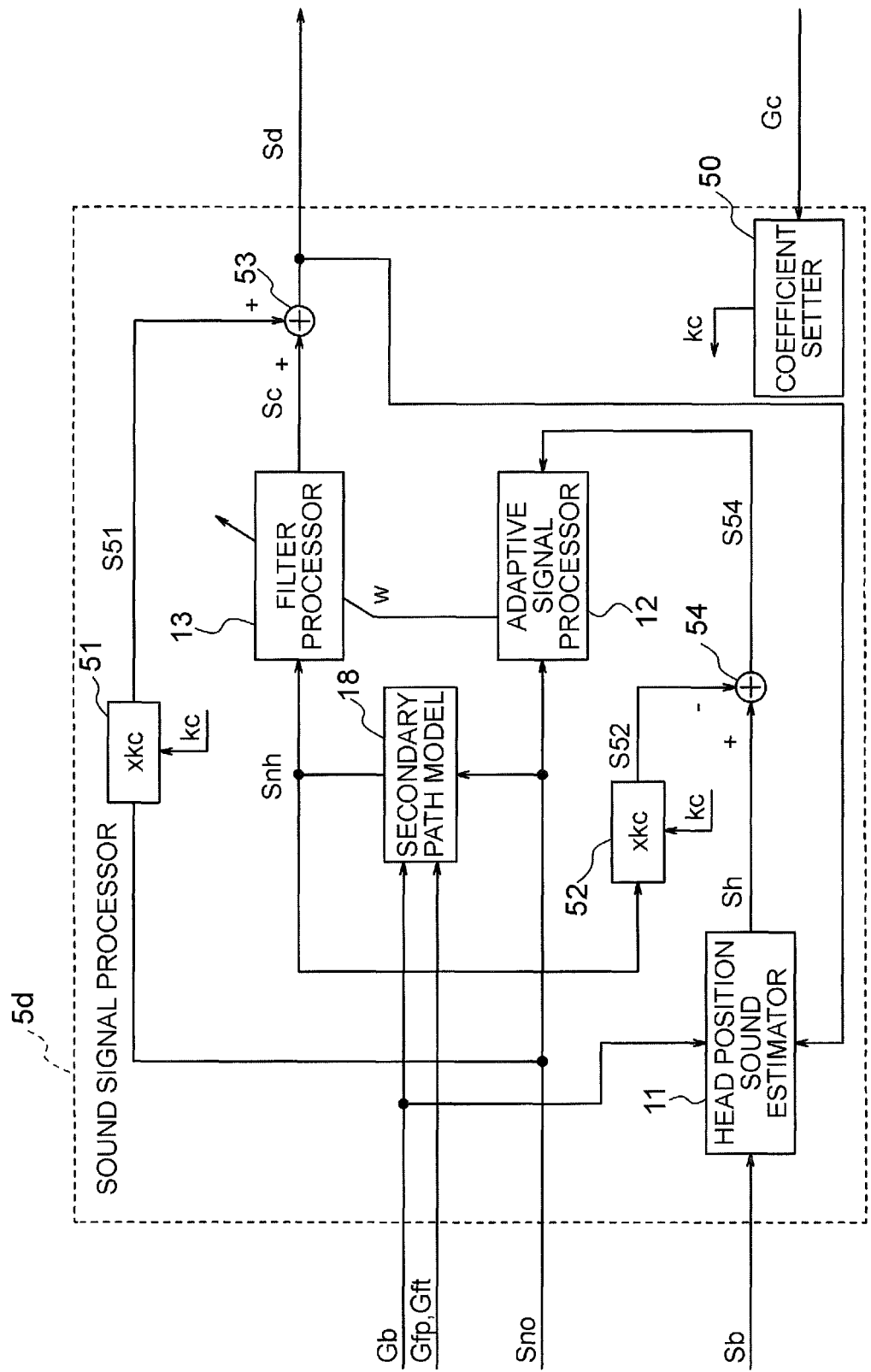
FIG. 10 is a block diagram illustrating a sound signal processor in the sound signal control device of FIG. 9.

The sound signal processor 5d used in the fourth embodiment is, for example, configured as illustrated in FIG. 10. The sound signal processor 5d illustrated in FIG. 10 is generally the same as the sound signal processor 5c of FIG. 8, but additionally includes a coefficient setter 50, coefficient multipliers 51 and 52, and adders 53 and 54.

Also, the cancellation sound signal output from the filter processor 13 is denoted by reference character Sc, and an output of the adder 53, which receives the cancellation sound signal Sc, is denoted by reference character Sd.

The coefficient setter 50, which is the same as the coefficient setter 40 of FIG. 6, sets a coefficient (inattention coefficient) kc depending on the attention state information Gc. The inattention coefficient kc ranges from 0 to 1, and is set to a greater value as the attention indicated by the attention state information Gc decreases.

The coefficient multiplier 51 multiplies the speaker position primary sound signal Sno by the coefficient kc set by the coefficient setter 50. An output S51 (=kc·Sno) of the coefficient multiplier 51 is a signal representing the part of the primary sound (noise) that is not reduced, i.e., a signal representing the part (primary sound remainder) that is to be heard by the driver.

The adder 53 adds the output S51 of the coefficient multiplier 51 to the cancellation sound signal Sc and outputs the addition result Sd (=kc·Sno+Sc). The output Sd of the adder 53 is a signal for reducing a part of the primary sound and allowing the remainder to be heard by the driver. The output Sd of the adder 53 is supplied to the output signal converter 6 as an output (control signal) of the sound signal processor 5*d* and supplied to the head position sound estimator 11.

Thereby, the speaker 102 is driven by the sum of the cancellation sound signal Sc and signal S51. Thus, the speaker 102 emits a sound that is weaker than the cancellation sound by an amount corresponding to the sound due to the signal S51, and the driver hears the part (part corresponding to the signal S51) of the noise.

Since the coefficient kc is increased as the attention decreases, the driver hears the noise louder as the attention decreases. This can recover the attention of the driver.

The head position sound estimator 11 receives the control signal Sd instead of the control signal Sc, and performs, on the collected sound signal Sb and control signal Sd, the same processing as described in the first embodiment, thereby generating the head position sound signal Sh. The head position sound signal Sh is the sum of the normal error signal (error signal in the case of leaving no noise) and an estimate of the remainder of the noise (primary sound) at the head position, as described in the second embodiment.

The coefficient multiplier 52 multiplies the head position primary sound signal Snh by the coefficient kc. An output S52 (=kc·Snh) of the coefficient multiplier 52 represents an estimate of the remainder of the primary sound at the head position.

The adder 54 subtracts the output S52 of the coefficient multiplier 52 from the head position sound signal Sh. The subtraction result represents a sound obtained by subtracting the primary sound remainder at the head position from the sound at the head position.

The adaptive signal processor 12 updates the set w of filter coefficients so that an output S54 (=Sh−kc·Snh) of the adder 54 approaches zero.

The filter processor 13 performs filtering with the set w of filter coefficients updated by the adaptive signal processor 12 and outputs the cancellation sound signal Sc.

Since the adaptive signal processor 12 updates the filter coefficients so that the output S54 of the adder 54 approaches zero, as described above, the filter processor 13 outputs a signal representing a cancellation sound for noise reduction.

In the fourth embodiment, the information (Gc) indicating the level of attention of the driver to driving is generated on the basis of information such as the image obtained by the image sensor 103, and the degree to which the noise at the head position is cancelled is adjusted on the basis of the information (Gc), as in the second embodiment. For example, when the information (Gc) indicating the state of the driver indicates that the attention is low, the degree of noise cancellation is decreased. This can recover the attention, contributing to safe driving.

Further, the effect is maintained regardless of changes in the position of the head due to driving operations or the like.

Fifth Embodiment

The first and third embodiments perform control so that the noise is completely cancelled, and the second and fourth embodiments adjust the degree of noise reduction according to the decrease in the attention of the driver. The fifth embodiment reduces noise output from a vehicle (referred to below as the "own vehicle") in which a sound signal control device is provided, for example, noise from a motor, and causes the driver to hear, as an alternative sound, a sound different from the noise output from the own vehicle, for example, a sound output from a vehicle different in type from the own vehicle.

Causing the driver to hear a sound output from a vehicle different in type from the own vehicle can make the driver feel as if driving the vehicle different in type from the own vehicle, increasing the driver's fun to drive. Also, when the attention of the driver is decreased, it is possible to recover the attention by increasing the volume of the sound different from the noise output from the own vehicle.

Figure 11:
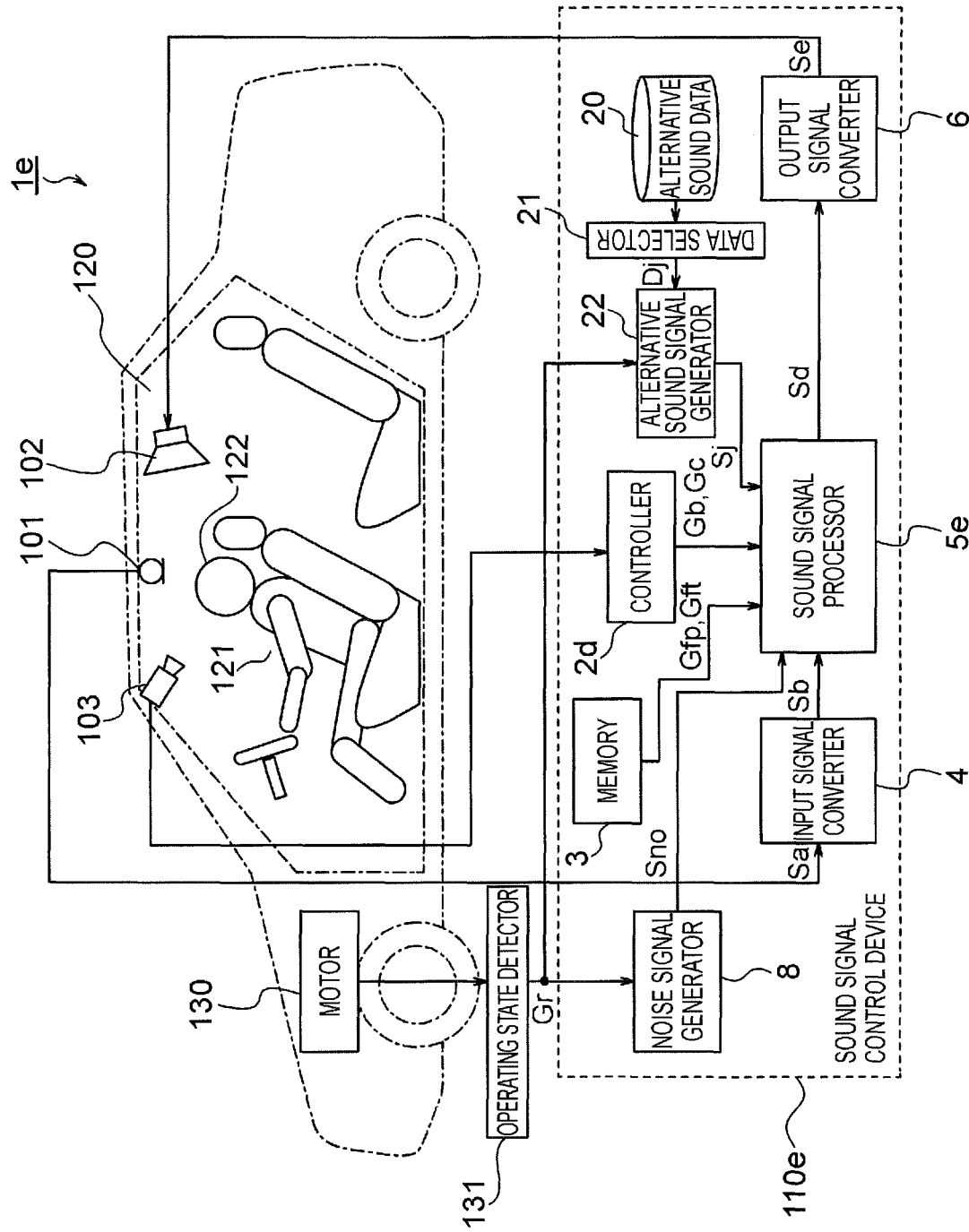
FIG. 11 is a block diagram illustrating a sound control device including a sound signal control device of a fifth embodiment of the present invention

FIG. 11 illustrates a sound control device 1*e* including a sound signal control device 110*e* of the fifth embodiment. In FIG. 11, reference characters that are the same as those in FIG. 9 denote the same parts.

The sound signal control device 110*e* illustrated in FIG. 11 is generally the same as the sound signal control device 110*d* illustrated in FIG. 9. However, an alternative sound data storage 20, a data selector 21, and an alternative sound signal generator 22 are added, and a sound signal processor 5*e* is provided instead of the sound signal processor 5*d*.

The alternative sound data storage 20 stores data of the sound of a motor of the vehicle different in type from the own vehicle, and is or includes, for example, a non-volatile memory. Examples of the vehicle different in type from the own vehicle include more sophisticated vehicles, sports cars, classic cars, and racing cars.

The alternative sound data storage 20 can store multiple alternative sound data items, and the data selector 21 can select and read one of the multiple alternative sound data items in accordance with an operation by the user, e.g., the driver.

The alternative sound signal generator 22 generates and outputs an alternative sound signal Sj on the basis of the operating state information Gr output from the operating state detector 131 and alternative sound data Dj selected by the data selector 21. For example, when the motor sound of a sports car is selected, a motor sound of the sports car is generated and output.

Figure 12:
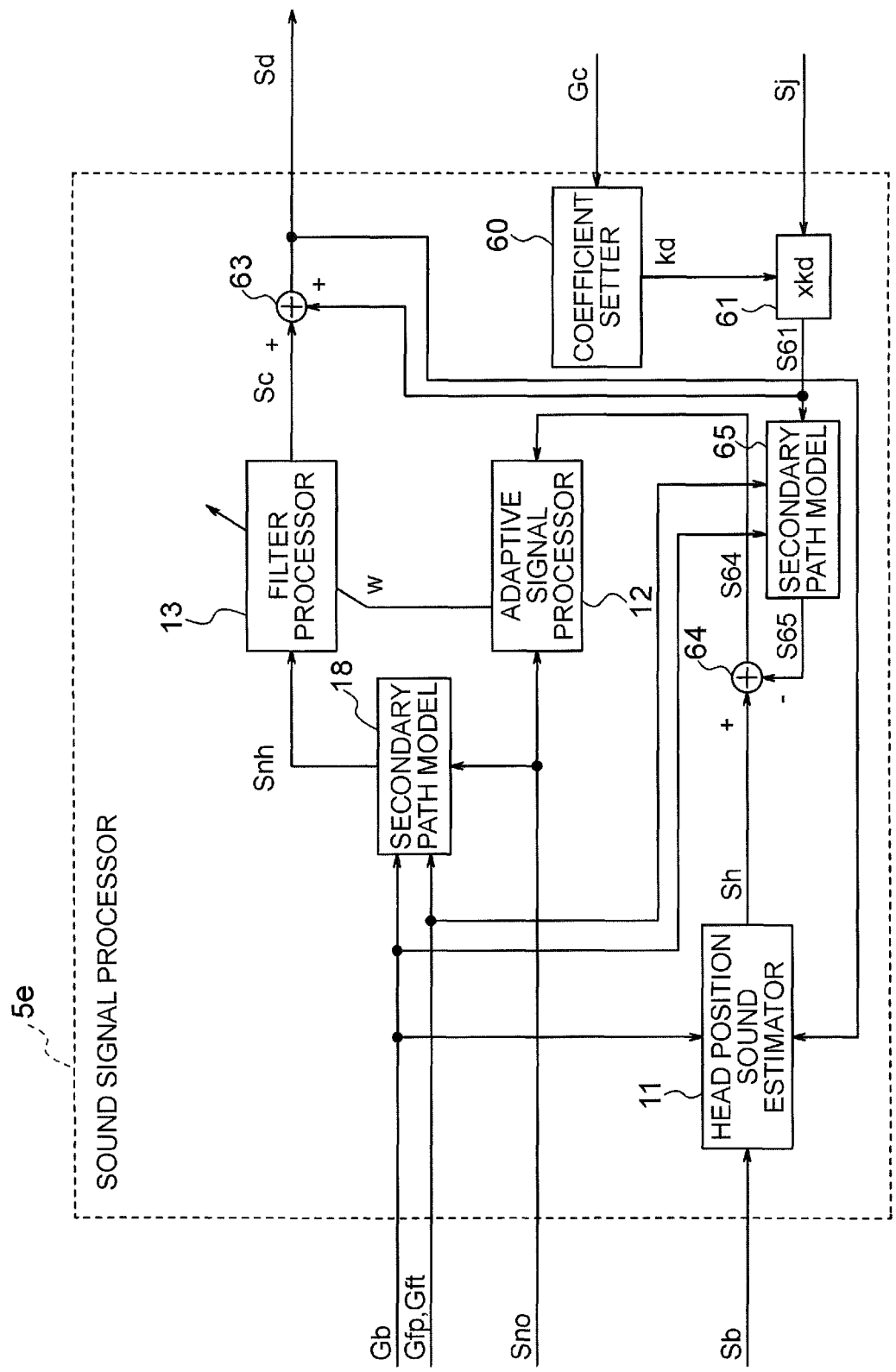
FIG. 12 is a block diagram illustrating a sound signal processor in the sound signal control device of FIG. 11.

FIG. 12 illustrates the sound signal processor 5*e* used in the fifth embodiment. The sound signal processor 5*e* illustrated in FIG. 12 is generally the same as the sound signal processor 5*c* of FIG. 8, but additionally includes a coefficient setter 60, a coefficient multiplier 61, adders 63 and 64, and a secondary path model 65.

Also, the cancellation sound signal output from the filter processor 13 is denoted by reference character Sc, and an output of the adder 63, which receives the cancellation sound signal Sc, is denoted by reference character Sd.

The coefficient setter 60, which is the same as the coefficient setter 50 of FIG. 10, sets a coefficient (inattention coefficient) kd depending on the attention state information Gc. The inattention coefficient kd is set to a greater value as the attention indicated by the attention state information Gc decreases. The coefficient kd is a coefficient used for adjusting the volume of the alternative sound, and is, for example, designed so that the volume is comparable to that of the noise of the motor 130 when kd=1.

The coefficient multiplier 61 multiplies the alternative sound signal Sj by the coefficient kd set by the coefficient setter 60. An output S61 (=kd·Sj) of the coefficient multiplier 61 is a signal representing an alternative sound after volume adjustment.

The adder 63 adds the output S61 of the coefficient multiplier 61 to the cancellation sound signal Sc and outputs the addition result Sd (=kd·Sj+Sc). The output Sd of the adder 63 is a signal for reducing the primary sound (noise from the own vehicle) and causing the driver to hear the alternative sound after volume adjustment. The output Sd of the adder 63 is supplied to the output signal converter 6 as an output (control signal) of the sound signal processor 5*d* and supplied to the head position sound estimator 11.

Thereby, the speaker 102 is driven by the sum of the cancellation sound signal Sc and signal S61. Thus, the speaker 102 emits a combination of the cancellation sound and a sound due to the signal S61 (=kd·Sj) obtained by multiplying the alternative sound signal Sj by the coefficient kd, and the driver hears the alternative sound after volume adjustment.

Since the coefficient kd is increased as the attention decreases, the driver hears the alternative sound louder as the attention decreases. This can recover the attention of the driver.

The head position sound estimator 11 receives the control signal Sd instead of the control signal Sc, and performs, on the collected sound signal Sb and control signal Sd, the same processing as described in the first embodiment, thereby generating the head position sound signal Sh. The head position sound signal Sh is the sum of the normal error signal (error signal in the case where the alternative sound is not superposed) and a value corresponding to the alternative sound.

The secondary path model 65, which is a model having an estimate of a transfer function between the speaker 102 and the head 122 as with the secondary path model 18, receives the output S61 (=kd·Sj) of the multiplier 61 and generates a signal S65. The output S65 of the secondary path model 65 represents an estimate of the sound at the head position corresponding to the signal S61.

The transfer function of the secondary path model 65 is also determined and updated on the basis of the information Gb indicating the position of the head 122, the information Gft representing the transfer functions for the multiple fixed positions, and the information Gfp representing the fixed positions.

The adder 64 subtracts the output S65 of the secondary path model 65 from the head position sound signal Sh. The subtraction result represents a sound obtained by subtracting the alternative sound from the sound at the head position.

The adaptive signal processor 12 updates the set w of filter coefficients so that an output S64 (=Sh−kd·Sj) of the adder 64 approaches zero.

The filter processor 13 performs filtering with the set w of filter coefficients updated by the adaptive signal processor 12 and outputs the cancellation sound signal Sc.

Since the adaptive signal processor 12 updates the filter coefficients so that the output S64 of the adder 64 approaches zero, as described above, the filter processor 13 outputs a signal representing a cancellation sound for noise reduction.

With the above configuration, it is possible to generate a sound, e.g., a motor sound, of a vehicle different in type from the own vehicle, while reducing the noise of the own vehicle, thereby providing a feeling as if driving the vehicle different in type from the own vehicle and increasing fun to drive.

Also, when the attention of the driver is decreased, the alternative sound is made louder by increasing the coefficient kd, in order to recover the attention. This can contribute to safe driving. Further, the effect is maintained regardless of changes in the position of the head due to driving operations or the like.

However, it is also possible to cause the alternative sound to be heard regardless of the level of the attention. In this case, the coefficient setter 60 and coefficient multiplier 61 may be omitted, and the output of the alternative sound signal generator 22 may be directly supplied to the adder 63 and secondary path model 65.

Also, although the above example causes a sound of a vehicle different in type from the own vehicle to be heard while reducing the noise of the own vehicle, it is also possible to cause a sound of a vehicle different in type from the own vehicle to be heard without reducing the noise of the own vehicle.

Although in the fifth embodiment, the output Sj of the alternative sound signal generator 22 is handled as a signal representing a sound at the position of the speaker 102, it may be handled as a signal representing a sound at the position of the sound source (e.g., motor 130) of the sound that is replaced with the alternative sound. For example, when the noise of the motor 130 is replaced with the alternative sound, the output Sj of the alternative sound signal generator 22 may be handled as a sound at the position of the motor 130. In this case, a signal obtained by passing it through a model of a transfer path from the sound source (e.g., motor 130) of the sound that is replaced with the alternative sound to the position of the speaker 102 may be used as a noise signal at the position of the speaker 102. For example, the output of the model may be input to the coefficient multiplier 61 instead of the signal Sj. This can enhance a feeling as if the alternative sound is emitted from the sound source (e.g., motor 130) of the sound that is replaced with the alternative sound. The same applies to the sixth and seventh embodiments described below.

Sixth Embodiment

Although in the fifth embodiment, the volume of the alternative sound is adjustable while the motor noise is reduced, the degree of reduction of the motor noise may also be adjustable.

Figure 13:
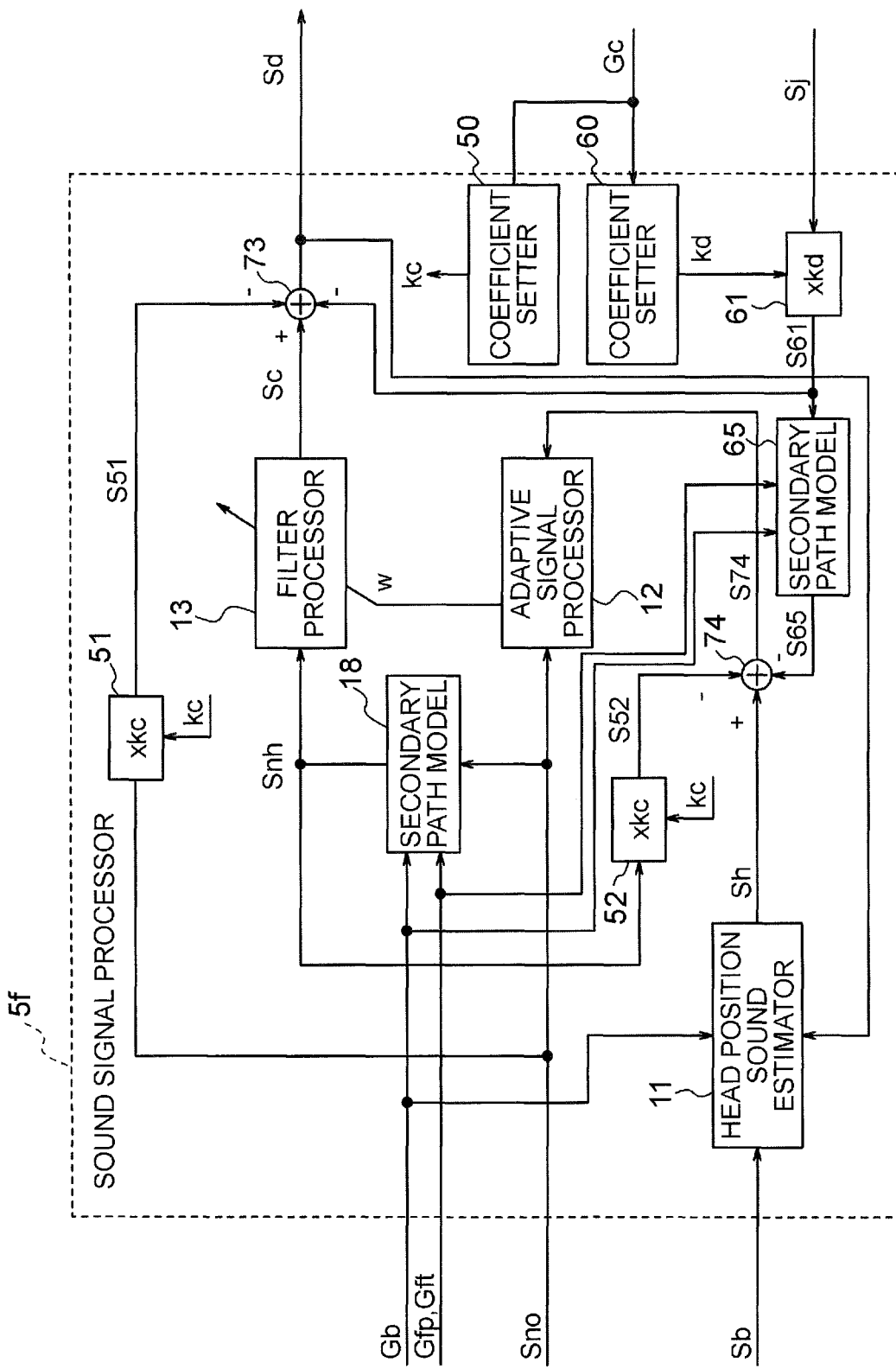
FIG. 13 is a block diagram illustrating a sound signal processor used in a sixth embodiment of the present invention.

In this case, for example, a sound signal processor 5*f* illustrated in FIG. 13 is used.

While the sound signal processor 5*f* illustrated in FIG. 13 is generally the same as the sound signal processor 5*e* of FIG. 12, it additionally includes a coefficient setter 50 and coefficient multipliers 51 and 52, and includes adders 73 and 74 instead of the adders 63 and 64.

The coefficient setter 50 and coefficient multipliers 51 and 52 are the same as the coefficient setter 50 and coefficient multipliers 51 and 52 of FIG. 10. The coefficient setter 50 sets a coefficient (inattention coefficient) kc depending on the attention state information Gc. The inattention coefficient kc ranges from 0 to 1, and is set to a greater value as the attention indicated by the attention state information Gc decreases.

The coefficient multiplier 51 multiplies the speaker position primary sound signal Sno by the coefficient kc as with the coefficient multiplier 51 of FIG. 10.

The coefficient multiplier 52 multiplies the head position primary sound signal Snh by the coefficient kc as with the coefficient multiplier 52 of FIG. 10.

The adder 73 adds an output S51 of the coefficient multiplier 51 and the output S61 of the coefficient multiplier 61 to the cancellation sound signal Sc and outputs the addition result Sd as a control signal.

The adder 74 subtracts, from the head position sound signal Sh, an output S52 of the coefficient multiplier 52 and an output S65 of the secondary path model 65, and outputs the subtraction result to the adaptive signal processor 12.

The adaptive signal processor 12 updates the set w of filter coefficients so that an output S74 (=Sh−kc·Snh−S65) of the adder 74 approaches zero.

The filter processor 13 performs filtering with the set w of filter coefficients updated by the adaptive signal processor 12 and outputs the cancellation sound signal Sc.

With the above configuration, it is possible to change the degree of noise reduction by adjusting the coefficient kc. It is also possible to change the volume of the alternative sound by adjusting the coefficient kd. For example, when the attention of the driver is decreased, it is possible to decrease the degree of noise reduction by increasing the coefficient kc and increase the volume of the alternative sound by increasing the coefficient kd.

In the sixth embodiment, since the degree of reduction in the noise of the own vehicle and the volume of the alternative sound are adjustable, for example, it is possible to control the degree of reduction in the noise of the own vehicle and the volume of the alternative sound depending on the attention state of the driver, and for example, it becomes possible to perform an optimum control depending on the preference or nature of the driver.

In the first to sixth embodiments, the single microphone 101 and the single speaker 102 are provided to the driver. However, two or more microphones and two or more speakers may be provided. When two or more microphones and two or more speakers are provided to the driver, the sound signal processor may use, for example, an algorithm (multiple error filtered-X algorithm) obtained by expanding the above-described filtered-X algorithm into multichannel.

Seventh Embodiment

While the first to sixth embodiments control sound reaching the ears of the driver, the seventh embodiment controls sound reaching the ears of a person other than the driver while controlling sound reaching the ears of the driver.

Figure 14:
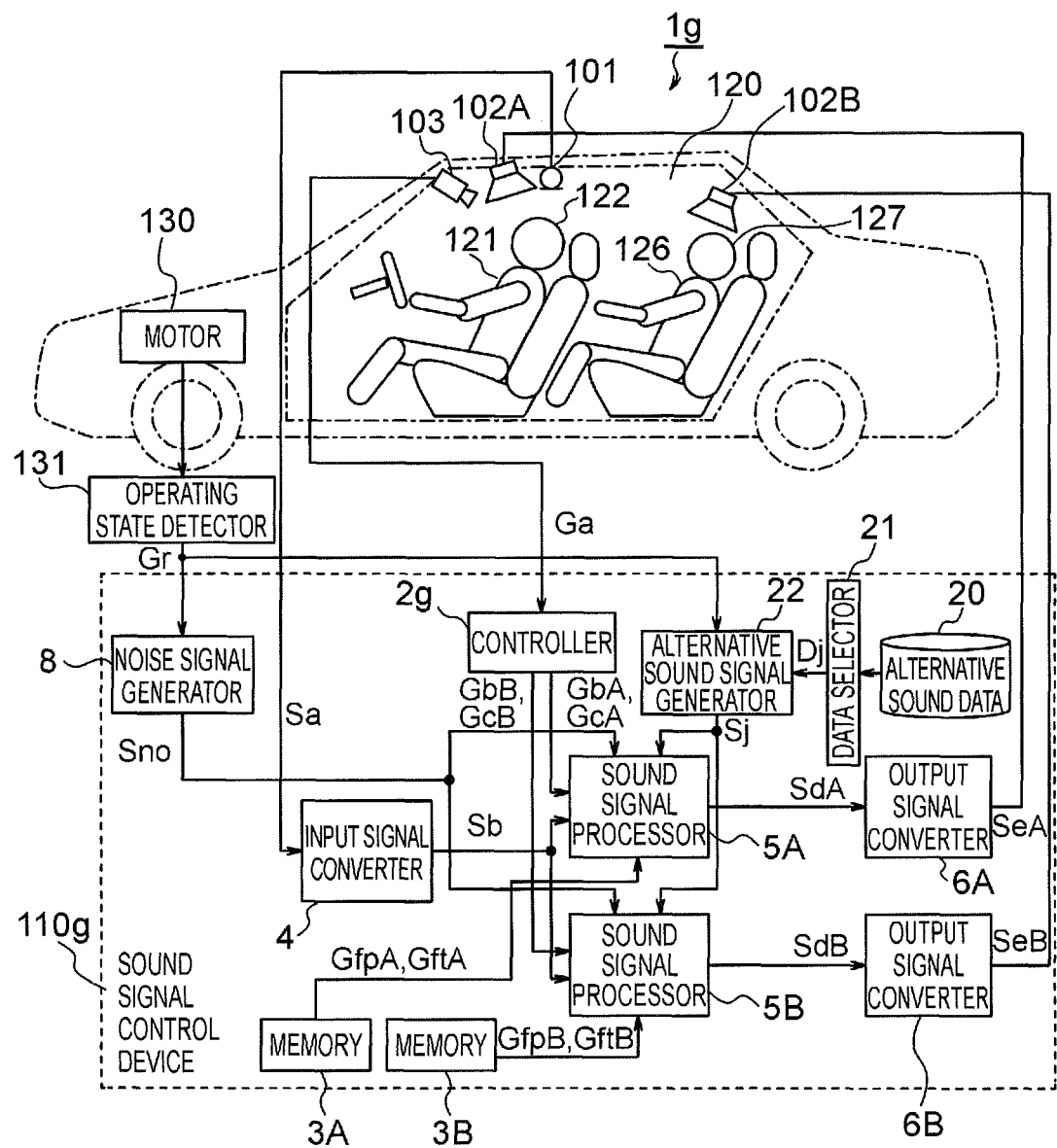
FIG. 14 is a block diagram illustrating a sound control device including a sound signal control device of a seventh embodiment of the present invention.

FIG. 14 illustrates a sound control device 1g including a sound signal control device 110g of the seventh embodiment. FIG. 14 illustrates, besides the driver 121, an occupant 126 of a rear seat as an example of an occupant other than the driver. In FIG. 14, reference characters that are the same as those in FIG. 11 denote the same parts.

The sound control device 1g illustrated in FIG. 14 is generally the same as the sound control device 1e illustrated in FIG. 11. However, first and second speakers 102A and 102B are provided instead of the speaker 102 of FIG. 11, and the sound signal control device 110g is provided instead of the sound signal control device 110e of FIG. 11.

The first speaker 102A is disposed at a position suitable for transmitting sound to the ears of the driver 121, e.g., near the ears of the driver 121, and the second speaker 102B is disposed at a position suitable for transmitting sound to the ears of the occupant 126 of the rear seat, e.g., near the ears of the occupant 126 of the rear seat.

The sound signal control device 110g of FIG. 14 is generally the same as the sound signal control device 110e of FIG. 11. However, a controller 2g, first and second memories 3A and 3B, first and second sound signal processors 5A and 5B, and first and second output signal converters 6A and 6B are provided instead of the controller 2d, memory 3, sound signal processor Se, and output signal converter 6.

Each of the first and second memories 3A and 3B stores the same information as the memory 3 of FIG. 11. However, the first memory 3A stores information used by the first sound signal processor 5A, specifically, information GfpA representing multiple fixed positions in a control target space set for the driver 121 and information GftA representing transfer functions between the fixed positions and the first speaker 102A. On the other hand, the second memory 3B stores information used by the second sound signal processor 5B, specifically, information GfpB representing multiple fixed positions in a control target space set for the occupant 126 of the rear seat and information GftB representing transfer functions between the fixed positions and the second speaker 102B.

The image sensor 103 images the driver 121 and the occupant 126 of the rear seat, and outputs object information Ga resulting from the imaging to the controller 2g.

On the basis of the object information Ga from the image sensor 103, the controller 2g generates information GbA indicating the position of the head 122 of the driver 121 and information GbB indicating the position of the head 127 of the occupant 126 of the rear seat, and generates information GcA indicating an attention state of the driver 121 and information GcB indicating a state of the occupant 126 of the rear seat.

The information GcB indicating the state of the occupant 126 of the rear seat is information indicating the level to which the occupant of the rear seat desires to rest, and for example, in cases such as when the occupant looks sleepy, when the occupant is asleep, or when the occupant has the seat reclined, it is determined that the level of desire to rest is high.

Each of the first and second sound signal processors 5A and 5B is the same as the sound signal processor 5f of FIG. 13, and each of the first and second output signal converters 6A and 6B is the same as the output signal converter 6 of FIG. 13.

However, the first sound signal processor 5A operates in the same manner as the sound signal processor 5f of FIG. 13 and supplies a control signal SdA to the output signal converter 6A, on the basis of the information GfpA and GftA stored in the memory 3A, the information GbA indicating the position of the head 122 of the driver and the information GcA regarding the attention state of the driver that are supplied from the controller 2g, the signal Sb obtained by sound collection by the microphone 101, and the noise signal Sno from the noise signal generator 8. The output signal converter 6A outputs a signal SeA for driving the speaker 102A, on the basis of the control signal SdA.

The second sound signal processor 5B operates in the same manner as the sound signal processor 5f of FIG. 13 and supplies a control signal SdB to the output signal converter 6B, on the basis of the information GfpB and GftB stored in the memory 3B, the information GbB indicating the position of the head 127 of the occupant 126 of the rear seat and the information GcB indicating the state of the occupant 126 of the rear seat that are supplied from the controller 2g, the signal Sb obtained by sound collection by the microphone 101, and the noise signal Sno from the noise signal generator 8. The output signal converter 6B outputs a signal SeB for driving the speaker 102B, on the basis of the control signal SdB.

Each of the first and second speakers 102A and 102B is the same as the speaker 102 of FIG. 13. However, the first speaker 102A is driven by the signal SeA, and the second speaker 102B is driven by the signal SeB.

As above, the first sound signal processor 5A and first output signal converter 6A are for controlling the sound heard by the driver 121, and the second sound signal processor 5B and second output signal converter 6B are for controlling the sound heard by the occupant 126 of the rear seat.

Each of the first sound signal processor 5A and second sound signal processor 5B is configured similarly to the sound signal processor 5f of FIG. 13. Hereinafter, components in the first sound signal processor 5A and second sound signal processor 5B will be described using the same reference characters as components in the sound signal processor 5f of FIG. 13.

The head position sound estimator 11 in the first sound signal processor 5A estimates sound at the position of the head 122 of the driver, and the secondary path model 18 in the first sound signal processor 5A has an estimate of a transfer function between the head 122 of the driver and the first speaker 102A.

The head position sound estimator 11 in the second sound signal processor 5B estimates sound at the position of the head 127 of the occupant of the rear seat, and the secondary path model 18 in the second sound signal processor 5B has an estimate of a transfer function between the head 127 of the occupant of the rear seat and the second speaker 102B.

As the attention indicated by the information GcA decreases, the coefficient setters 50 and 60 in the first sound signal processor 5A increase the coefficients kc and kd, thereby decreasing the degree of noise reduction and increasing the volume of the alternative sound.

On the other hand, as the level of desire to rest indicated by the information GcB increases, the coefficient setters 50 and 60 in the second sound signal processor 5B decrease the coefficients kc and kd, thereby increasing the degree of noise reduction and decreasing the volume of the alternative sound.

The above is an example, and the control may be performed in other manners. In short, it is sufficient that the controls for the driver and the other occupant be performed independently of each other.

The memories 3A and 3B need not be separate, but the information stored in these may be stored in a single memory.

Also, although the above example controls the sound heard by the occupant of the rear seat as an occupant other than the driver, the same control may also be performed for occupants, such as an occupant of a passenger's seat, other than those of the rear seat In the seventh embodiment, it is possible to separately control the sound presented to the driver and the sound presented to the other occupant. This makes it possible, for example, to recover, when the attention of the driver to driving is decreased, the attention by decreasing the noise reduction or increasing the volume of the alternative sound, and provide, when the other occupant desires to rest, a better environment for rest by reducing noise.

It is also possible to perform the control for two occupants other than the driver instead of for the driver and an occupant other than the driver. Further, the target of the control may be three or more persons. When the target of the control is three or more persons, the combination of the memory (or the set of information stored in the memory), sound signal processor, output signal converter, and speaker may be provided for each of the persons who are the target of the control.

In the first to seventh embodiments, the sound control device has been described as including its own speaker(s). As the speaker(s), it is possible to use speaker(s) used for another purpose, e.g., speaker(s) used in an audio device for radio broadcast reception or recording medium reproduction.

In this case, a sound signal from a sound output portion of the audio device may be added by the adder 63 or 73, and passed through the secondary transfer path (65 in FIG. 13) and then subtracted by the adder 64 or 74, as with the alternative sound signal of FIG. 12 or 13.

When the sound control device is configured to use speaker(s) of an audio device, since the speaker(s) used in the audio device can be used for sound control for noise reduction or recovery of the attention to driving, the device needs less cost and no space for placing separate speaker(s).

Although the fifth to seventh embodiments have been described as modifications of the third embodiment, the same modifications may be made to the first embodiment.

Each of the portions (the portions illustrated as the functional blocks) of the sound signal control device of each of the above embodiments can be implemented by processing circuitry. The processing circuitry may be dedicated hardware or a processor that executes a program stored in a memory.

For example, the functions of the respective portions of the sound signal control device may be implemented by respective separate processing circuits or a single processing circuit.

The hardware may be a large scale integrated circuit (LSI), such as a digital signal processor (DSP), an application specific integrated circuit (ASIC), or a field-programmable gate array (FPGA).

When the processing circuitry is a processor, the function of each portion of the sound signal control device is implemented by software, firmware, or a combination of software and firmware. The software or firmware is described as a program and stored in a memory. The processing circuitry implements the function of each portion by reading and executing the program stored in the memory.

It is also possible that a part of the functions of the respective portions of the sound signal control device is implemented by dedicated hardware and the other part is implemented by software or firmware.

Figure 15:
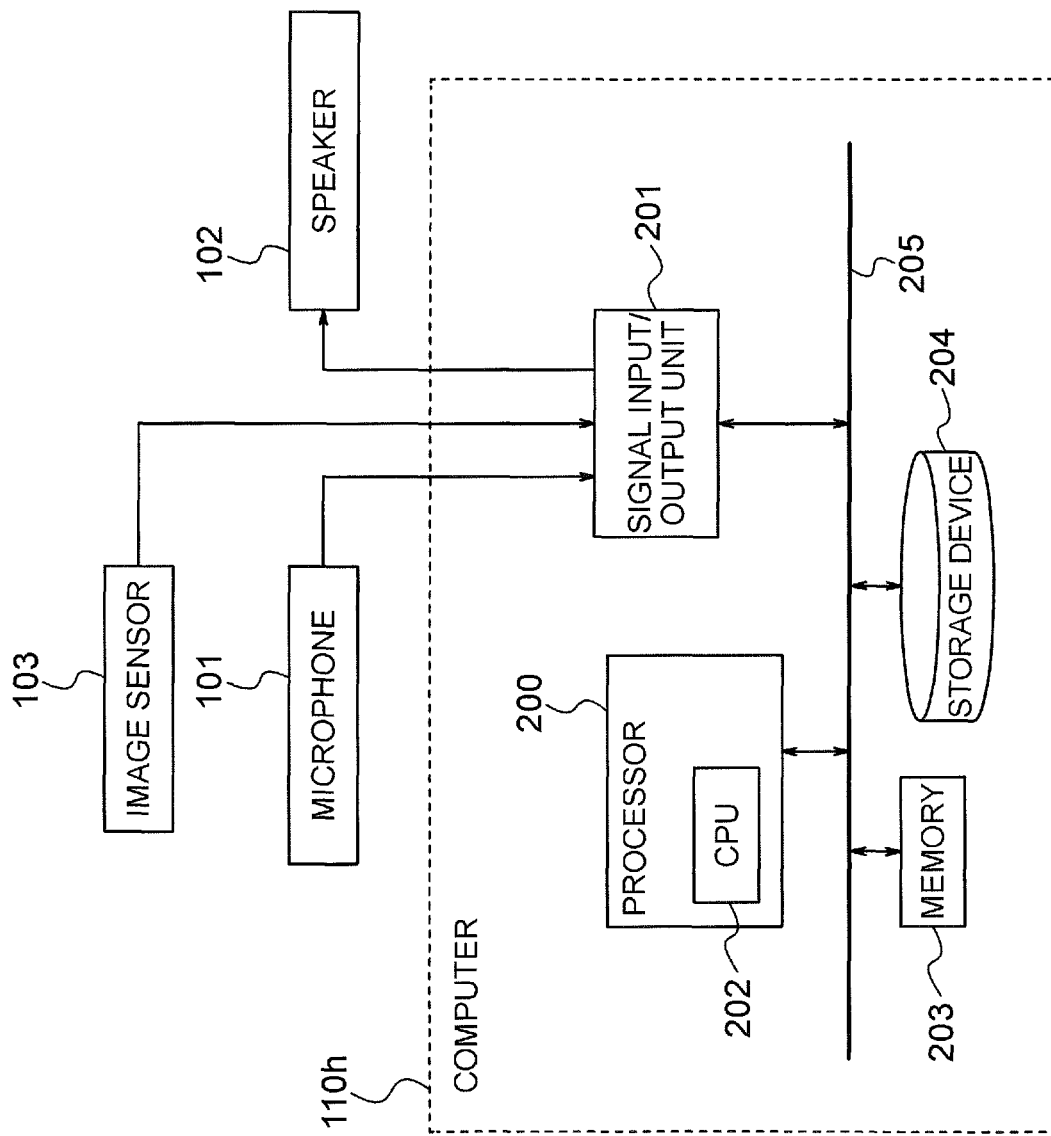
FIG. 15 is a block diagram illustrating a configuration in which functions of the sound signal control device of the first embodiment are implemented by a computer.

FIG. 15 illustrates an example of a configuration in which all the functions of the sound signal control device 110 of the first embodiment are implemented by a computer 110h including a single processor, also illustrating the microphone 101, speaker 102, and image sensor 103.

The computer 110h illustrated in FIG. 15 includes the processor 200 including a CPU 202, a signal input/output unit 201, a memory 203, and a storage device 204, which are mutually connected via a signal path 205, such as a bus.

The signal input/output unit 201 is an interface circuit for connection to the microphone 101, speaker 102, and image sensor 103.

The memory 203 includes a ROM and a RAM, and is used as a program memory that stores various programs for implementing processing of the sound signal control device 110, a working memory used by the processor 200 in data processing, a memory into which signal data is loaded, or the like.

The storage device 204 is used to store various data, such as various setting data of the processor 200 and signal data. For example, volatile memories, such as SDRAMs, hard disc drives (HDDs), and solid state drives (SSDs) can be used as the storage device 204. The storage device 204 can store programs including an operating system (OS), and various data, such as various setting data and sound signal data, such as data indicative of the internal state of the filter. Data in the memory 203 may be stored in the storage device 204.

The processor 200 uses the memory 203 as a working memory, operates according to the programs stored in the memory 203, and performs processing of each portion of the sound signal control device 110 of the first embodiment on the collected sound signal and image that are input through the signal input/output unit 201. A drive signal resulting from the processing is supplied to the speaker 102 through the signal input/output unit 201.

The programs for executing the processing of the sound signal control device of the embodiment may be stored in the storage device 204 or memory 203, or may be provided by being recorded in a storage medium, such as a compact disc (CD) or a universal serial bus (USB) memory. Also, they may be provided from another computer through a wireless or wired network, such as a local area network (LAN). The microphone 101, speaker 102, and image sensor 103 may be connected to the computer 110h through a wireless or wired network.

Although the above describes a case where the processing of the sound signal control device of the first embodiment is executed by a computer, the processing of the sound signal control devices of the other embodiments may also be executed by a computer.

Modifications

In the first to seventh embodiments, the sampling frequency of the input signal converter has been described as being 16 kHz. However, the sampling frequency is not limited to this, but may be, for example, 8 kHz or 48 kHz.

The first to seventh embodiments use, as the image sensor 103, a camera having a function of measuring distances to respective portions of an object by means of ultrasound or laser light. However, instead, the controller may measure distances to respective portions of an object by using a known method such as a motion stereo method or homography using planar projective transformation.

It is also possible to use two or more cameras as the image sensor 103 and obtain distances to respective portions of an object by using the principle of triangulation.

In the first to seventh embodiments, the input sound transducer is the microphone 101 that detects sound traveling in air. However, the input sound transducer may be a vibration sensor that detects sound wave vibration.

In the first to seventh embodiments, the output sound transducer is the speaker 102. However, the output sound transducer may be a vibration actuator that outputs sound wave vibration.

The first to seventh embodiments have described a case where the noise to be reduced is motor noise. However, the noise to be reduced may be other noises, such as road noise (noise caused by contact between the wheels and the road).

In the first to seventh embodiments, the space subjected to the sound control is a vehicle interior. However, the space subjected to the sound control may be spaces, such as a living room, an office room, a conference room, or a workshop, other than the vehicle interior. In this case, when there are cameras, microphones, and speakers used for a video phone, a video conference system, or the like, they may be used for the sound control described in the above embodiments.

When the space subjected to the sound control is a space other than the vehicle interior, sound at a head of a "person," which is a generalization of a "driver" or an "occupant," is controlled.

Besides, various modifications or omissions can be made without departing from the concept of the present invention.

REFERENCE SIGNS LIST 1, 1b, 1c, 1d, 1e, 1g sound control device, 2, 2b, 2c, 2d, 2g controller, 3, 3A, 3B memory, 4 input signal converter, 5, 5a, 5b, 5c, 5d, 5e, 5f, 5A, 5B sound signal processor, 6, 6A, 6B output signal converter, 8 noise signal generator, 11 head position sound estimator, 12 adaptive signal processor, 13 filter processor, 14, 16, 18 secondary path model, 20 alternative sound data storage, 21 data selector, 22 alternative sound signal generator, 40, 50, 60 coefficient setter, 41, 42, 51, 52, 61 coefficient multiplier, 43, 44, 53, 54, 63, 64 adder, 65 secondary path model, 73, 74 adder, 101 microphone (input sound transducer), 102 speaker (output sound transducer), 103 image sensor, 110, 110b, 110c, 110d, 110e, 110g sound signal control device, 130 motor, 131 operating state detector, 200 processor, 201 signal input/output unit, 202 CPU, 203 memory, 204 recording medium, 205 signal path.

The invention claimed is:

1. A sound signal control device in a sound control device including an input sound transducer to detect sound in a space, an image sensor to image a person in the space, and an output sound transducer to emit sound into the space, the sound signal control device comprising:
  a controller to generate information indicating position of head of the person on a basis of an image imaged by the image sensor;
  a sound signal processor to generate a control signal for controlling sound at the position of the head of the person on a basis of a collected sound signal representing the sound detected by the input sound transducer and the information indicating the position of the head of the person; and
  an output signal converter to cause the output sound transducer to emit sound corresponding to the control signal into the space,
  wherein the sound signal processor generates cancellation sound signal for cancelling noise at the position of the head of the person on a basis of the collected sound signal and the information indicating the position of the head of the person, and generates the control signal on a basis of the cancellation sound signal,
  wherein the sound signal processor includes:
    a head position sound estimator to generate an estimate of the sound at the position of the head of the person on a basis of the collected sound signal;
    an adder to generate an estimate of the noise at the position of the head of the person by subtracting, from the estimate of the sound at the position of the head of the person, an estimate of a sound at the position of the head of the person corresponding to the control signal;
a filter processor to perform filter processing on the estimate of the noise at the position of the head of the person by using a set of filter coefficients and output the cancellation sound signal; and
an adaptive signal processor to update the set of filter coefficients on a basis of the estimate of the sound at the position of the head of the person,
wherein the space is a space in a vehicle, and the person is an occupant,
wherein the controller generates information indicating state of the occupant on a basis of the image, and
wherein the sound signal processor adjusts a degree to which the noise at the position of the head of the occupant is cancelled, on a basis of the information indicating the state of the occupant.

2. The sound signal control device of claim 1, wherein the sound signal processor adds, to the cancellation sound signal, a signal obtained by multiplying, by a coefficient ranging from 0 to 1, a signal representing an estimate of noise at a position of the output sound transducer corresponding to a signal representing the estimated noise at the position of the head of the person, and outputs a result of the addition as the control signal.

3. The sound signal control device of claim 1, wherein
the occupant is a driver, and the information indicating the state of the occupant is information indicating a level of attention of the driver to driving, and
when the information indicating the state of the occupant indicates that the attention is low, the sound signal processor decreases the degree to which the noise is cancelled.

4. The sound signal control device of claim 1, further comprising:
an alternative sound data storage to store alternative sound data representing an alternative sound different from noise of the vehicle; and
an alternative sound signal generator to output, as an alternative sound signal, a signal representing the alternative sound,
wherein the sound signal processor outputs, as the control signal, a result of addition of the alternative sound signal to the cancellation sound signal.

5. The sound signal control device of claim 4, wherein
the noise of the vehicle is noise of a motor of the vehicle in which the sound signal control device is provided,
the alternative sound is sound of a motor of a vehicle different in type from the vehicle in which the sound signal control device is provided, and
the alternative sound signal generator generates the alternative sound signal on a basis of the alternative sound data and information indicating an operating state of the motor of the vehicle in which the sound signal control device is provided.

6. The sound signal control device of claim 4, wherein the sound signal processor adjusts a volume of the alternative sound on a basis of the information indicating the state of the occupant.

7. A sound signal control device in a sound control device including an input sound transducer to detect sound in a space, an image sensor to image first and second persons in the space, and first and second output sound transducers to emit sound into the space, the sound signal control device comprising:

a controller to generate information indicating a position of a head of the first person and information indicating a position of a head of the second person, on a basis of an image imaged by the image sensor;
a first sound signal processor to generate a first control signal for controlling sound at the position of the head of the first person on a basis of a collected sound signal representing the sound detected by the input sound transducer and the information indicating the position of the head of the first person;
a second sound signal processor to generate a second control signal for controlling sound at the position of the head of the second person on a basis of the collected sound signal and the information indicating the position of the head of the second person;
a first output signal converter to cause the first output sound transducer to emit a sound corresponding to the first control signal into the space; and
a second output signal converter to cause the second output sound transducer to emit a sound corresponding to the second control signal into the space,
wherein the first sound signal processor generates a first cancellation sound signal for cancelling noise at the position of the head of the first person on a basis of the collected sound signal and the information indicating the position of the head of the first person, and generates the first control signal on a basis of the first cancellation sound signal,
wherein the second sound signal processor generates a second cancellation sound signal for cancelling noise at the position of the head of the second person on a basis of the collected sound signal and the information indicating the position of the head of the second person, and generates the second control signal on a basis of the second cancellation sound signal,
wherein the first sound signal processor estimates the noise at the position of the head of the first person from an estimate of the sound at the position of the head of the first person based on the collected sound signal and an estimate of a sound at the position of the head of the first person corresponding to the first control signal, and generates the first cancellation sound signal on a basis of the estimated noise at the position of the head of the first person, and
wherein the second sound signal processor estimates the noise at the position of the head of the second person from an estimate of the sound at the position of the head of the second person based on the collected sound signal and an estimate of a sound at the position of the head of the second person corresponding to the second control signal, and generates the second cancellation sound signal on a basis of the estimated noise at the position of the head of the second person.

8. The sound signal control device of claim 7, wherein
the controller generates information indicating a state of the first person and information indicating a state of the second person, on a basis of the image,
the first sound signal processor adjusts a degree to which the noise at the position of the head of the first person is cancelled, on a basis of the information indicating the state of the first person, and
the second sound signal processor adjusts a degree to which the noise at the position of the head of the second person is cancelled, on a basis of the information indicating the state of the second person.

9. The sound signal control device of claim 8, wherein
the space is a space in a vehicle, the first person is a driver, and the second person is another occupant other than the driver,
the information indicating the state of the driver is information indicating a level of attention of the driver to driving,
the information indicating the state of the other occupant is information indicating a level to which the other occupant desires to rest,
when the information indicating the state of the driver indicates that the attention is low, the first sound signal processor generates, as the first control signal, a signal such that the degree to which the noise is cancelled is decreased, and
when the information indicating the state of the other occupant indicates that the level of desire to rest is high, the second sound signal processor generates, as the second control signal, a signal such that the degree to which the noise is cancelled is increased.

10. A sound signal control method in a sound control device including an input sound transducer to detect sound in a space, an image sensor to image first and second persons in the space, and first and second output sound transducers to emit sound into the space, the sound signal control method comprising:
generating information indicating a position of a head of the first person and information indicating a position of a head of the second person, on a basis of an image imaged by the image sensor;
generating a first control signal for controlling sound at the position of the head of the first person on a basis of a collected sound signal representing the sound detected by the input sound transducer and the information indicating the position of the head of the first person;
generating a second control signal for controlling sound at the position of the head of the second person on a basis of the collected sound signal and the information indicating the position of the head of the second person;
causing the first output sound transducer to emit a sound corresponding to the first control signal into the space; and
causing the second output sound transducer to emit a sound corresponding to the second control signal into the space,
wherein the generating the first control signal comprises generating a first cancellation sound signal for cancelling noise at the position of the head of the first person on a basis of the collected sound signal and the information indicating the position of the head of the first person, and generating the first control signal on a basis of the first cancellation sound signal,
wherein the generating the second control signal comprises generating a second cancellation sound signal for cancelling noise at the position of the head of the second person on a basis of the collected sound signal and the information indicating the position of the head of the second person, and generating the second control signal on a basis of the second cancellation sound signal,
wherein the generating the first cancellation sound signal comprises estimating the noise at the position of the head of the first person from an estimate of the sound at the position of the head of the first person based on the collected sound signal and an estimate of a sound at the position of the head of the first person corresponding to the first control signal, and generating the first cancellation sound signal on a basis of the estimated noise at the position of the head of the first person, and
wherein the generating the second cancellation sound signal comprises estimating the noise at the position of the head of the second person from an estimate of the sound at the position of the head of the second person based on the collected sound signal and an estimate of a sound at the position of the head of the second person corresponding to the second control signal, and generating the second cancellation sound signal on a basis of the estimated noise at the position of the head of the second person.

11. A non-transitory computer-readable recording medium storing a program for causing a computer to execute a process of the sound signal control device of claim 1.

12. A non-transitory computer-readable recording medium storing a program for causing a computer to execute a process of the sound signal control device of claim 7.

13. A non-transitory computer-readable recording medium storing a program for causing a computer to execute a process of the sound signal control method of claim 10.

* * * * *